(12) United States Patent
Mullis et al.

(10) Patent No.: US 8,090,088 B2
(45) Date of Patent: *Jan. 3, 2012

(54) SYSTEM AND METHOD FOR PRIVACY SCREENING

(75) Inventors: Karen Mullis, Loganville, GA (US); Anita Hogans Simpson, Decatur, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1230 days.

This patent is subject to a terminal disclaimer.

(21) Appl. No.: 11/559,407

(22) Filed: Nov. 14, 2006

(65) Prior Publication Data

US 2007/0121871 A1 May 31, 2007

Related U.S. Application Data

(63) Continuation of application No. 10/183,850, filed on Jun. 28, 2002, now Pat. No. 7,162,019, which is a continuation-in-part of application No. 10/108,706, filed on Mar. 29, 2002, now abandoned, and a continuation-in-part of application No. 10/108,347, filed on Mar. 29, 2002, now Pat. No. 7,266,190.

(51) Int. Cl.
*H04M 1/56* (2006.01)
*H04M 15/06* (2006.01)
*H04M 3/42* (2006.01)

(52) U.S. Cl. .......... 379/142.06; 379/142.01; 379/210.03

(58) Field of Classification Search ............... 379/88.11, 379/88.19, 88.2, 142.01, 142.05, 142.06, 379/142.07, 142.17, 201.04, 201.06, 201.07, 379/201.11, 207.13, 207.15, 210.02, 210.03, 379/211.01, 211.02; 455/411, 415, 417
See application file for complete search history.

(56) References Cited

U.S. PATENT DOCUMENTS

| | | | | | |
|---|---|---|---|---|---|
| 5,467,388 | A | * | 11/1995 | Redd et al. | 379/210.02 |
| 6,041,103 | A | * | 3/2000 | La Porta et al. | 379/67.1 |
| 6,289,092 | B1 | * | 9/2001 | Nishiara | 379/215.01 |
| 6,718,021 | B2 | * | 4/2004 | Crockett et al. | 379/93.23 |
| 7,162,019 | B1 | * | 1/2007 | Mullis et al. | 379/142.06 |
| 2003/0215078 | A1 | * | 11/2003 | Brahm et al. | 379/211.02 |

* cited by examiner

*Primary Examiner* — Quoc D Tran
(74) *Attorney, Agent, or Firm* — Cantor Colburn LLP

(57) ABSTRACT

A communications network-based system and service is disclosed. The service permits subscribers to control and manage incoming telephone calls. Subscribers can establish preferences for how calls will be handled by a communications network if the calls are received while the subscriber has a privacy screening service engaged. The service also notifies a subscriber of a calling party's call based on whether preselected or predesignated preferences of the called party correspond to identifier(s) of the calling party.

13 Claims, 26 Drawing Sheets

*2302*

| Information Network Bypass List | | |
|---|---|---|
| Phone Number | Name/Details | Notify Time |
| 505-555-7777 | Mom's cell phone | ALL |

Disposition Preference for "Mom's cell phone"
For ☐ Weekdays ☐ Weekends ☐ Special

| Time Period | Preference | |
|---|---|---|
| | Connect to: | |
| 12 a.m. to 6 a.m. | ☐ Cell | ☐ 2nd line |
| | ☐ Office | ☐ Voicemail |
| | ☐ Custom #1 | ☐ Custom #2 |
| | Terminate with message: | |
| | ☐ no message | ☐ message (standard) |
| | ☐ custom message #1 | ☐ custom message #2 |
| 6 a.m. to 5 p.m. | ☐ Cell | ☐ 2nd line |
| | ☐ Office | ☐ Voicemail |
| | ☐ Custom #1 | ☐ Custom #2 |
| | Terminate with message: | |
| | ☐ no message | ☐ message (standard) |
| | ☐ custom message #1 | ☐ custom message #2 |
| 5 p.m. to 7 a.m. | ☐ Cell | ☐ 2nd line |
| | ☐ Office | ☐ Voicemail |
| | ☐ Custom #1 | ☐ Custom #2 |
| | Terminate with message: | |
| | ☐ no message | ☐ message (standard) |
| | ☐ custom message #1 | ☐ custom message #2 |
| 7 p.m. to 12 a.m. | ☐ Cell | ☐ 2nd line |
| | ☐ Office | ☐ Voicemail |
| | ☐ Custom #1 | ☐ Custom #2 |
| | Terminate with message: | |
| | ☐ no message | ☐ message (standard) |
| | ☐ custom message #1 | ☐ custom message #2 |

Figure 23

SYSTEM AND METHOD FOR PRIVACY SCREENING

RELATED APPLICATIONS

This application is a continuation of U.S. application Ser. No. 10/183,850, filed Jun. 28, 2002, now U.S. Pat. No. 7,162,019 which is a continuation-in-part of U.S. patent application Ser. No. 10/108,706, filed Mar. 29, 2002, now abandoned and U.S. patent application Ser. No. 10/108,347, filed on Mar. 29, 2002, now U.S. Pat. No. 7,266,190 which are herein incorporated by reference in their entirety.

BACKGROUND

1. Field of the Invention

The present invention relates to a system and method for privacy screening.

2. Background of the Invention

Many telephone customers do not wish to be disturbed by unwanted telephone calls. Most customers especially dislike being disturbed at certain times of the day, such as dinner time or after midnight. In an effort to prevent disturbing telephone calls, many customers turn their home telephone off—some by unplugging it, some by turning it off, and some by turning its ringer off. Others forward their calls to voicemail. In some cases, customers use CLASS Call Forwarding Variable Service.

Turning off their telephone or forwarding their calls can cause them to miss calls that they may want to take. If they forget to turn their telephone back on or stop forwarding their calls, they will miss every call. And, unless they have voicemail, even if they remember to turn their telephone back on, they will miss calls that came in while their telephone was off, some of which they would want to receive.

Also, even if they forwarded their calls to voicemail, they will not know who called until they call their voicemail to check, which may delay them from talking with someone they want to talk to right away. Further, only callers who left a voicemail message will be logged in the caller's voicemail box.

In addition, people's practice of turning off their home telephone is costly to the telephone services providers, such as Bell South. It is costly because the telephone service providers have to spend their resources to connect telephone calls to a person's telephone even when their telephone is off. Because the person does not hear the telephone, the telephone may ring for as long as the calling party wants to wait, further draining the service provider's resources because the service provider keeps the call connected until the calling party hangs up.

In an effort to prevent disruptive telephone calls, many customers subscribe to services provided by service providers that restrict calls from being connected to the subscriber. Some of these services prevent all calls from being connected to the subscriber, such as call-forwarding. One of the problems with these services is that they prevent calls from being connected that the subscriber may want to take.

Other services prevent all calls from being connected unless the subscriber takes the effort, after the call has been made, to agree accept the call. In order to receive calls, the subscriber may be required to answer a call from the service provider, listen to a message from the calling party to determine who is calling, and tell the service provider that the call can be connected. Not only can this be irritating, it may also inform the calling party that the subscriber is home and does not wish to speak to the calling party. It can also be embarrassing when the called party knows the calling party but refuses to take to call. Generally, this arrangement wastes time because it requires excessive participation of the subscriber.

Further, even without subscribing to such a service, many telephone customers miss important calls and are not connected to calling parties that they wish to be connected to for various reasons. One such example is when the customer is already on the line. Typically in such a case, the feature the service provider provides is to play a busy signal to the calling party and to not connect the calling party. Another typical feature, sometimes called "call waiting," informs the customer that he or she has received another call. One problem with this feature, however, is that the customer first has to talk with the calling party without knowing whether or not the customer wishes to take the call.

Also, many telephone customers do not wish to miss all telephone calls when they are connected to an information network. To receive notification of calls, many customers subscribe to services provided by service providers that notify the subscriber of all calls that come in, usually by interjecting into the subscriber's computer screen a notification that a call has come in. One problem with these services is that, in some cases, they do not allow the subscriber to selectively determine beforehand whether or not the subscriber wants to be notified. Another problem with these services is that they do not allow a subscriber to determine, after being notified, how a call shall be handled other than to choose to be connected to the calling party. Still another problem with these services is that they do not allow a subscriber to give a calling party the power to disconnect the subscriber from an information session without the subscriber's post-call approval.

Also, subscribers to privacy screening services do not wish calling parties from whom subscribers wish to receive calls to be unnecessarily screened by such privacy screening services.

A privacy screening service is a service that allows a subscriber to the privacy screening service to screen incoming calls. The privacy screening service provides information to the called party (in this case, the subscriber to the privacy screening service) that allows the subscriber to make an informed decision as to whether or not to answer the call. For example, a subscriber may use the privacy screening service to block all private calls from going through. Private telephone numbers include telephone numbers that block services such as "calling party ID" that would otherwise identify the calling party to the called party. In telephone systems that offer private numbers and a privacy screening service to its customers, calls from a private number to a subscriber with the privacy screening service cannot be completed, unless the calling party authorizes the system to override the privacy of his number.

If the calling party's number is public, a communications network connects the call to the calling party, and typically also supplies the calling party's telephone number and sometimes the calling party's name.

If the number of the calling party is private, however, the prior art system asks the calling party to record his or her name before routing the call to the subscriber-a time consuming process. Routing the call to the subscriber generally requires a complex sequence of calls, queries and responses, thus burdening the network with additional traffic. Calling parties that call frequently, such as the subscriber's close friends or family members (or the subscriber himself or herself, calling home), who call from private numbers, would be unnecessarily screened each time they made calls to the subscriber. Such calling parties may find the unnecessary delays of having to listen to and respond to the privacy screening announcements very inconvenient.

Privacy screening systems are described in U.S. patent application Ser. Nos. 09/372,746 and 09/372,676 which are both incorporated herein by reference.

SUMMARY OF THE INVENTION

The present invention is directed to a communications-network-based call reception limiter that prevents calls from ringing to a telephone. The network does so by directing calls made from a calling party to a third party, rather than directing the call to the party to which the calling party intended to be connected (the called party).

In an embodiment, the period during which the network directs calls away from the called party may be set in advance, such that the period expires automatically.

In another embodiment, the period during which the network directs calls away from the called party may be set for certain hours of each day of the week, such that the period begins and expires automatically one or more times each day.

In another embodiment, the network communicates the identity and/or calling time of the calling party to the called party during the period that the network directs calls away from the called party.

In another embodiment, the network directs calls to voicemail.

In another embodiment, the network directs calls to a service node.

In another embodiment, the network is configured to allow the called party to set the periods during which the network will direct calls away from the called party via a telephone-based system.

In another embodiment, the network is configured to allow the called party to set the periods during which the network will direct calls away from the called party via a web interface.

In another embodiment, the network includes an intelligent network that includes three network elements and a database.

The present invention is directed to managing communications by connecting calls to a telephone that otherwise would not automatically accept connection of a call. The communications network does so by connecting calls made from a calling party to a called party if the calling party's number is on an encumbered-line bypass list.

In another embodiment, the communications network includes an intelligent communications network that includes three communications network elements and a database.

In another embodiment, the communications network allows a subscriber of the encumbered-line bypass feature to provision his or her preferences through an interface system and method.

In still another embodiment, the communications network allows a subscriber of the encumbered-line bypass feature to provision his or her preferences through an interactive voice response system and method.

The present invention is also directed to managing communications by selectively notifying a called party of a call when the called party is connected to an information network. A communications network determines whether or not to notify the called party of a calling party's call by comparing identifiers of the calling party with information communicated by the called party prior to the communications network receiving the call.

In another embodiment, the communications network determines in what manner to notify a called party of a calling party's call by comparing identifiers of the calling party with information communicated by the called party prior to the communications network receiving the call.

In another embodiment, the communications network determines whether or not to connect a calling party to a called party by comparing identifiers of the calling party with information communicated by the called party prior to the communications network receiving the call.

In another embodiment, the communications network determines to what other telephone line or network element to connect a calling party by comparing identifiers of the calling party with information communicated by the called party prior to the communications network receiving the call.

In still another embodiment, the communications network determines whether or not to connect a calling party to a called party or another telephone line or network element by receiving a command from the called party.

In still another embodiment, the communications network allows a called party to provision his or her preferences through an interactive voice response and/or interface system and method for calls received while the called party is connected to an information network.

The present invention is also directed to managing communications by selectively connecting or transferring a calling party having a private telephone number when the called party has a privacy screening service engaged. A communications network determines whether or not to connect a calling party's call to the called party by comparing identifiers of the calling party with information communicated by the called party to the communications network.

In another embodiment, a communications network determines whether or not to transfer a calling party's call to a transfer number by comparing identifiers of the calling party with information communicated by the called party.

In another embodiment, the communications network determines to what other telephone line or network element to connect a calling party by comparing identifiers of the calling party with information communicated by the called party prior to the communications network receiving the call.

In still another embodiment, the communications network allows a called party to provision his or her preferences through an interactive voice response and/or interface system and method for calls received while the called party has a privacy screening service engaged.

Additional features and advantages of the invention will be set forth in the description that follows, and in part will be apparent from the description, or may be learned by practice of the invention. The objectives and advantages of the invention will be realized and attained by the structure and steps particularly pointed out in the written description, the claims and the drawings.

BRIEF DESCRIPTION OF THE DRAWINGS

FIG. 23 is a schematic diagram of a preferred embodiment of an information network bypass list for a particular telephone number in accordance with the present invention.

DETAILED DESCRIPTION OF THE INVENTION

Figure 1:
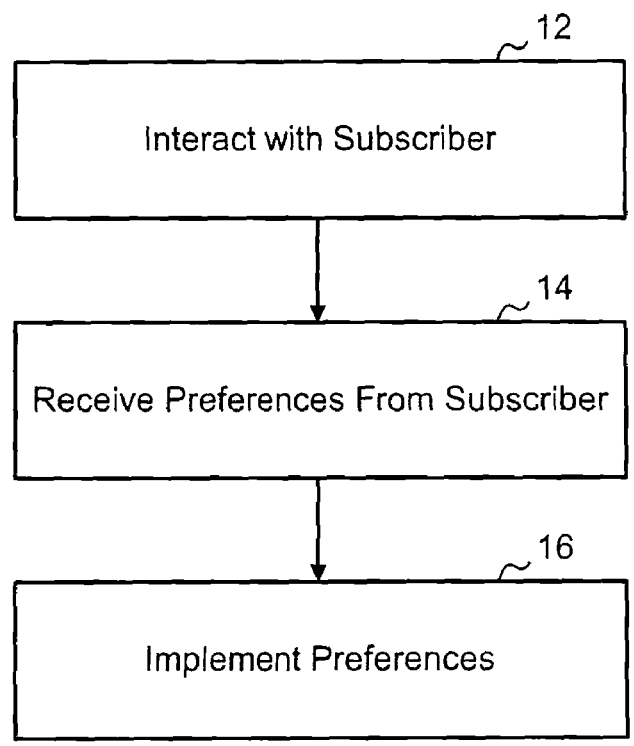
FIG. 1 is a flow diagram of a preferred embodiment of a method in accordance with the present invention.
Figure 5:
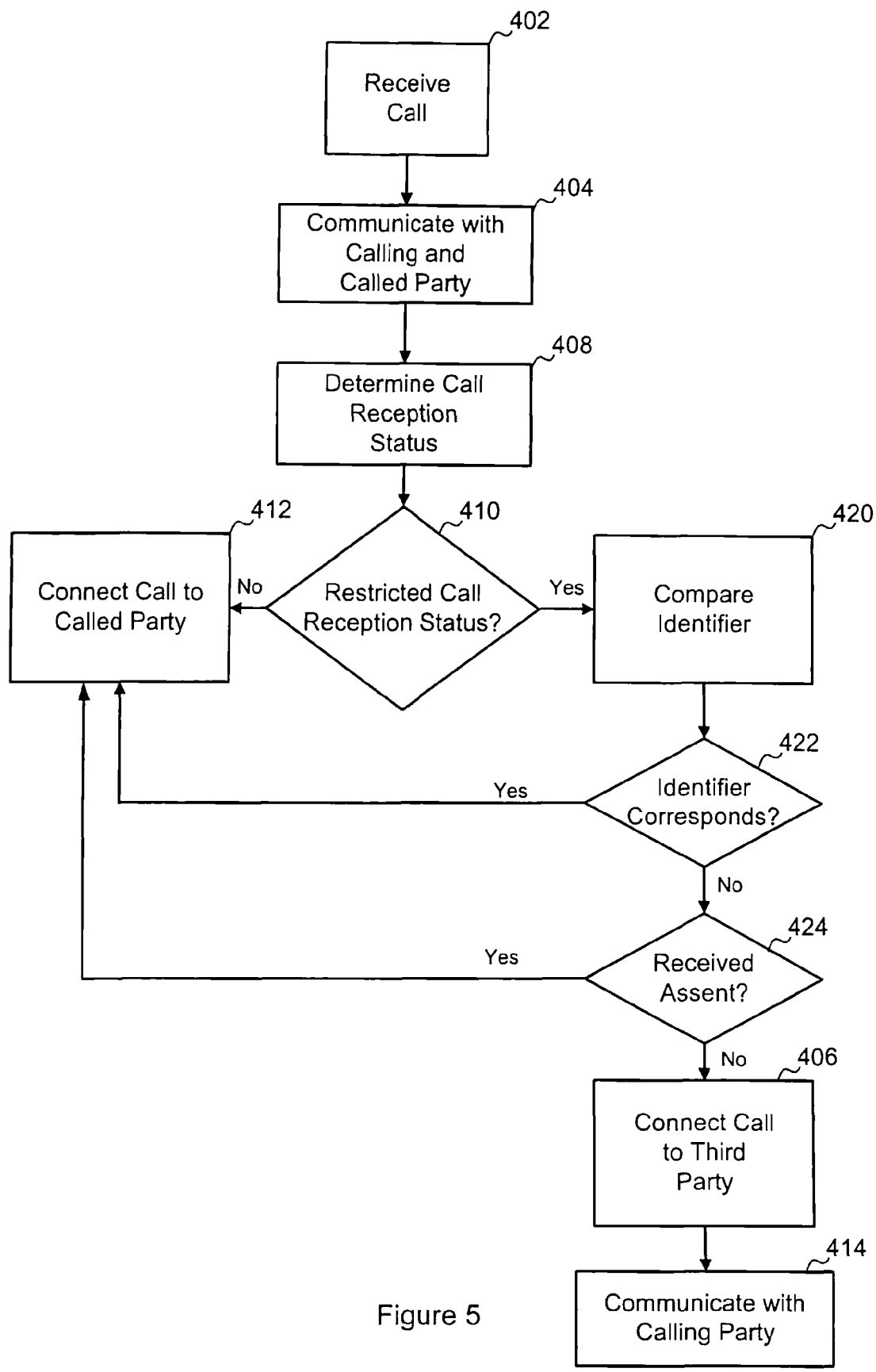
FIG. 5 is a flow diagram of a preferred embodiment of a method in accordance with the present invention.

For clarity and to facilitate an understanding of the preferred methods shown in connection with FIG. 5, this description includes an overview of a preferred embodiment of a method as set forth in FIG. 1.

FIG. 1 is a flow diagram of a preferred embodiment of a method in accordance with the present invention. Generally, this preferred method provides the method by which a system communicates with a subscriber of one or more services to receive and implement the subscriber's preferences for the services. Many different systems and platforms could be used to implement this method and the methods described below. For clarity, however, the below description uses a communications network as an example of one of the many possible systems or platforms.

In step 12, the communications network interacts with the subscriber of the services. These services may include a restricted status service and other services. In an exemplary embodiment, any of these services may also include an encumbered-line bypass list. These services and the encumbered-line bypass list are discussed in detail below.

Also as discussed below, the communications network preferably interacts with the subscriber by receiving a call into an interactive voice response (IVR) system. In an exemplary embodiment, the communications network interacts with the subscriber through an interface system. In another exemplary embodiment, the interface system may include a web interface. Through these or other interactions, the communications network proceeds according to step 14 to receive preferences from the subscriber. These preferences may include many different choices, features, and options, many of which are discussed below.

Figure 9:
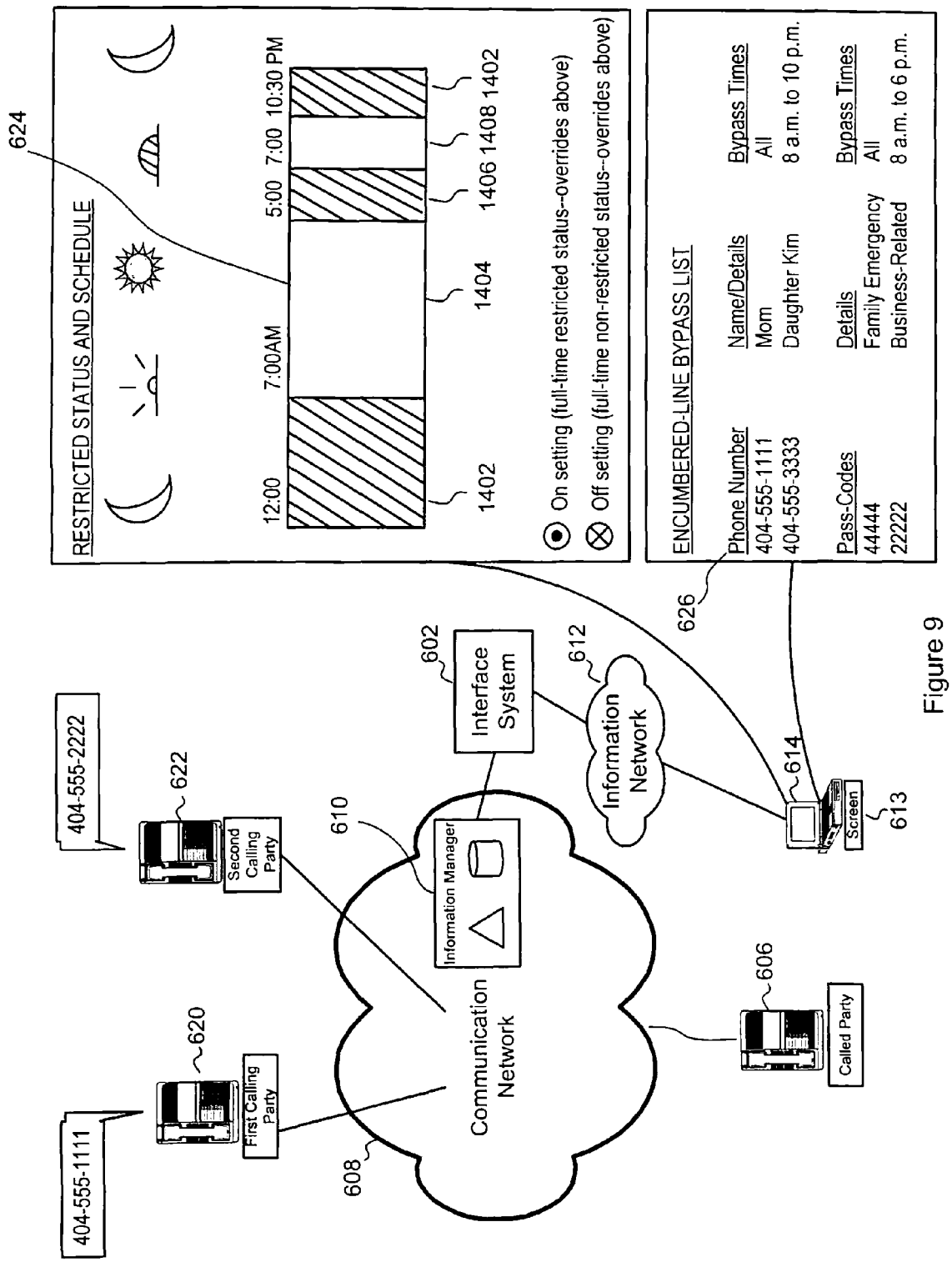
FIG. 9 is a schematic diagram of a preferred embodiment of an interface system in accordance with the present invention.

In step 16, the communications network implements the subscriber's preferences. By so doing, the communications network may serve the subscriber according to the subscriber's preferences. For the restricted status service, for example, the subscriber could set his or her preferences to a default restricted call reception status lasting from 5 p.m. to 7 p.m. weekdays. An exemplary embodiment of this preference is shown in FIG. 9, time period 1406, for a particular weekday. If the subscriber set this for a 5 p.m. to 7 p.m. time period as the subscriber's preference, the communications network generally will prevent calls from ringing to the subscriber's landline, home telephone Monday through Friday from 5 p.m. to 7 p.m.

As an additional example, the subscriber could set his or her preferences to a restricted call reception status lasting from 5 p.m. to 7 p.m. weekdays and from 10:30 p.m. to 7 a.m. all days. An exemplary embodiment of these preferences is shown in FIG. 9, time periods 1406 and 1402, for a particular weekday. Also, the subscriber could, for example, include two telephone numbers (e.g., the subscriber's mother and daughter) on an encumbered-line bypass list; one number (e.g., the subscriber's daughter) allowed to bypass a restricted call reception status from 8 a.m. to 10 p.m. and one telephone number (e.g., the subscriber's mother) for all times. By so doing, the communications network would prevent all calls from ringing to the subscriber's landline, home telephone from Monday through Friday from 5 p.m. to 7 p.m. except calls from the subscriber's mother and sister.

Also by so doing, the communications network would prevent all calls from ringing to the subscriber's landline, home telephone every day from 10:30 p.m. to 7 a.m. except calls from the subscriber's mother.

In the exemplary embodiment shown in FIG. 9 for time periods 1404 and 1408, the communications network would not prevent calls from ringing to the subscriber's landline, home telephone during time periods 1404 and 1408.

In a another example, the subscriber could set his or her preferences to an on setting, thereby overriding the restricted status time periods in graph 624 and thereby setting a restricted call reception status lasting 24 hours a day, every day of the week. Drawing from a previous example and the encumbered-line bypass list shown in FIG. 9, the subscriber's mom would bypass 24 hours a day, and the subscriber's daughter would bypass from 8 a.m. to 10 p.m. Calling parties using pass-code 44444 would bypass 24 hours a day. Calling parties using pass-code 22222 would bypass from 8 a.m. to 6 p.m.

In a another example, the subscriber could set his or her preferences to an off setting, thereby overriding the restricted status time periods in graph 624 and thereby setting a non-restricted call reception status lasting 24 hours a day, every day of the week. With this setting, the subscriber's landline, home telephone would not have any time periods with a restricted status.

These examples above are set forth simply to further explain the overview given above. These two possible scenarios for a subscriber's preferences are for one service, the restricted status service, and should not be deemed in any way limiting of the restricted status service or any other service. Many other preferences are possible, many of which are set forth below.

Figure 2:
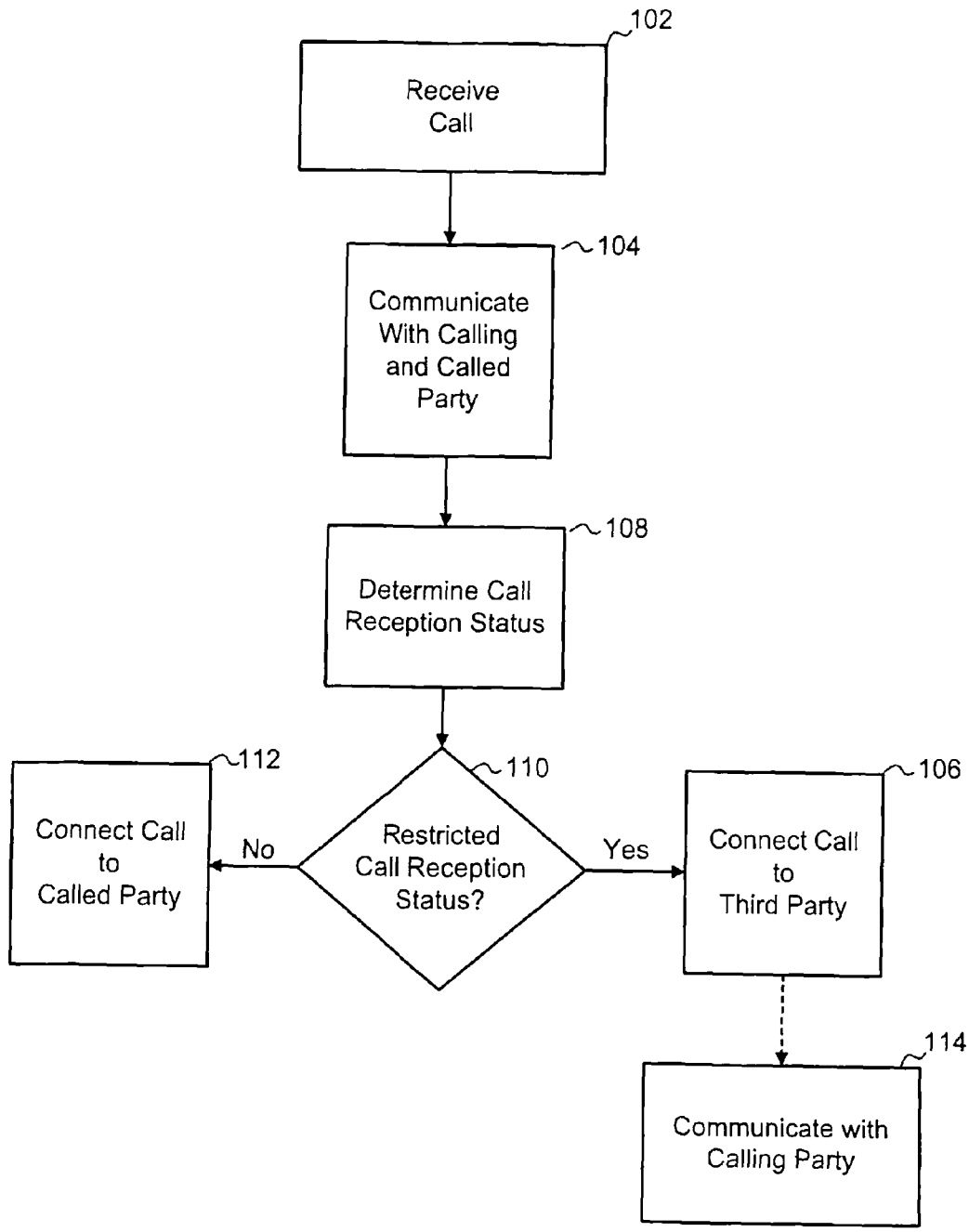
FIG. 2 is a flow diagram of a preferred embodiment of a method in accordance with the present invention.

FIG. 2 is a flow diagram of a preferred embodiment of a method in accordance with the present invention. This preferred embodiment sets forth, in part, a method showing how the communications network may proceed to prevent calls from ringing to the home, land-line telephone of a called party that is a subscriber of a restricted status service. For clarity, the below description often uses a called party 448 shown in FIG. 6 as an example.

In step 102 of FIG. 2, the communications network receives a call from a calling party. For clarity, the below description often uses a calling party 442 shown in FIG. 6 as an example. The communications network is preferably an intelligent communications network and, in an exemplary embodiment, an advanced intelligent communications network. In one embodiment, the communications network is an intelligent communications network shown in FIG. 7, comprising three communications network elements, 504, 506, and 508, and a database 502. Many different systems and platforms could be used to implement this method and the methods described below. For clarity, however, the below description often uses a communications network 450 in FIG. 6 as an example of one of the many possible systems or platforms.

The call received by communications network 450 from calling party 442 may be received by communications network 450 through a telephone landline, a cellular system, voice-over-internet, or other types of communication.

Typically, when calling party 442 makes the call, calling party 442 desires to be connected to called party 448. A non-limiting example of this common practice is: someone dials another person's telephone number. If Jane, for instance, wants to call Bill, she picks up her telephone (cell phone, landline telephone, hand-held text-based device, or what-have-you) and dials Bill's number. Jane is trying to be connected to Bill's telephone.

Called party 448 may be a subscriber of the restricted status service, however, which may or may not be set to prohibit calls at the time calling party 442 calls. The restricted status service, when it prohibits calls, is encumbering called party 448's telephone line. For the restricted status service and other encumbrances, calling party 442's call may be treated by communications network 450 as a request by calling party 442 to be connected to called party 448.

Communications network 450 to which calling party 442 is connected may determine not to connect calling party 442 to called party 448. Communications network 450 may instead connect the call to someone or something, such as a third party, other than called party 448. For clarity, the below description often uses a third party 446 shown in FIG. 6 as an example.

Preferably, before communications network 450 determines whether or not to connect calling party 442 to called party 448, communications network 450 communicates with calling party 442 and called party 448 according to step 104. Communications network 450 also preferably communicates with called party 448 using out-of-band signaling.

Figure 4:
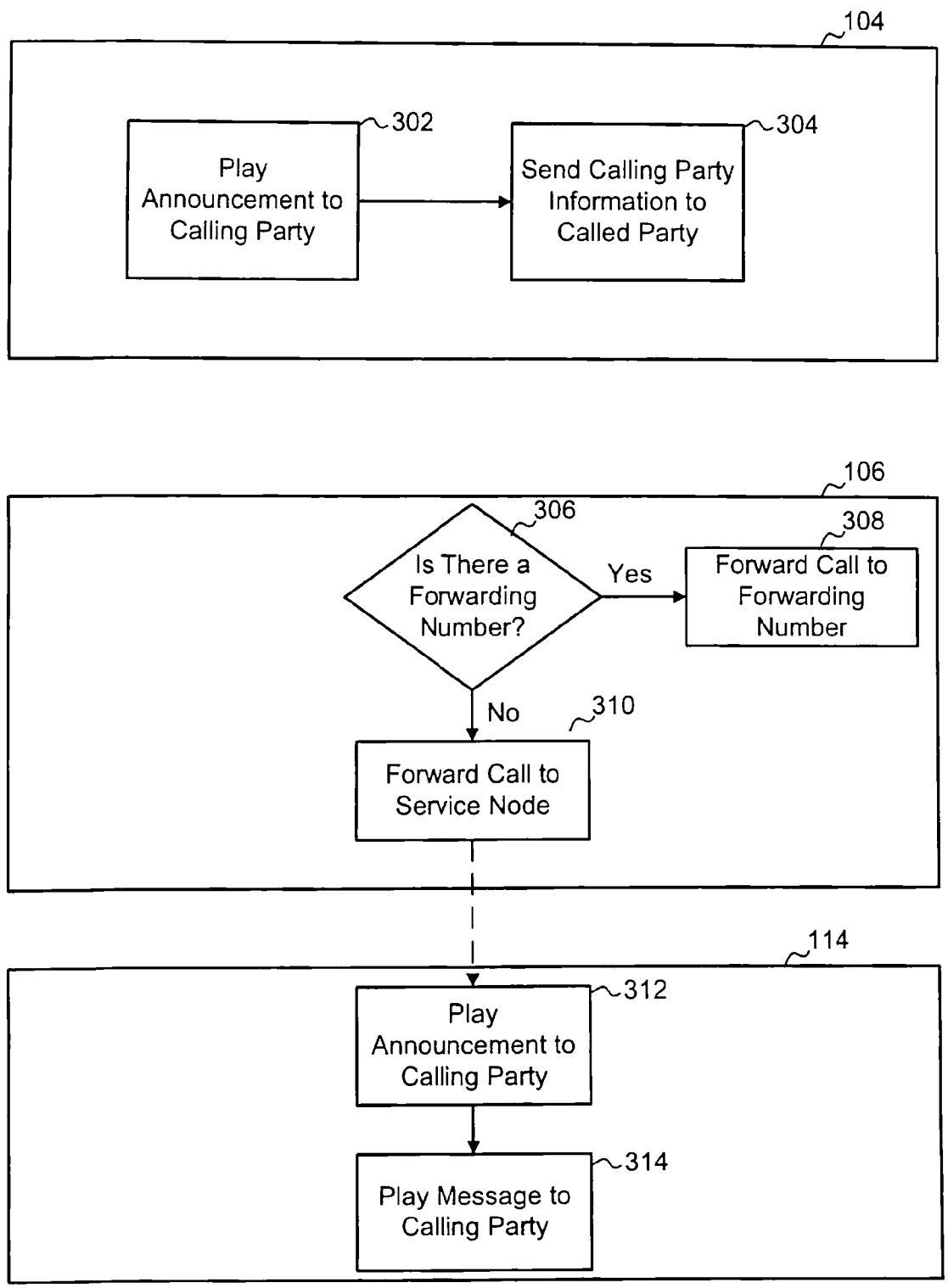
FIG. 4 is a schematic diagram of preferred embodiments of three steps in accordance with the present invention.

In one embodiment of the invention, step 104 is performed as shown, in part, through FIG. 4. FIG. 4 sets forth, in part, a flow diagram of this embodiment of step 104. In this embodiment, as part of this communication step 104, communications network 450 communicates with calling party 442 according to step 302. This communication may take the form of playing an audible ring announcement, or some other announcement or message set forth herein, such as: a busy signal; an announcement informing calling party 442 that called party 448 is not accepting calls; an announcement informing calling party 442 to call back at some other time; an announcement customized by called party 448, which may include called party 448's voice; a standard audio announcement; or another announcement.

The audible ring announcement informs calling party 442 that communications network 450 is working on the call. This audible ring announcement may also lead calling party 442 to believe that communications network 450 has connected calling party 442 to called party 448. By playing this audible ring announcement, calling party 442 may believe that he or she is connected to called party 448 and thus is waiting for called party 448 to pick up. In other embodiments, the announcement may not be an audible ring announcement, but rather another tone, no tone at all, or an announcement or message set forth above.

In another embodiment, also shown in FIG. 4, as part of this communication step 104, communications network 450 communicates with called party 448 according to step 304. In this embodiment, communications network 450 preferably communicates one or more identifiers related to calling party 442 to called party 448. These identifiers may include calling party 442's telephone number, calling party 442's name, the time calling party 442 called, and/or whatever identifiers or other information is available to communications network 450. Communications network 450 can communicate one, several, or all of the identifiers to called party 448.

In another embodiment, communications network 450 communicates to called party 448, step 104, inaudibly.

In still another embodiment, communications network 450 communicates to called party 448, step 104, using a text-based display, such as a liquid crystal display.

In still another embodiment of this communication step 104, shown in step 304, communications network 450 communicates data about calling party 442 that was input by calling party 442. This data could include a voice entry, such as calling party 442 saying their name, or a pass-code (input by voice, key pad, or otherwise), or other data. The pass-code and input data can be identifiers associated with calling party 442 and will be discussed further below.

As set forth in FIG. 2, after or simultaneously with communicating with called party 448 and calling party 442 according to step 104, or simply after step 102 if step 104 is not performed, communications network 450 determines the call reception status, step 108, of called party 448. In doing so, communications network 450 is working to protect called party 448 from unwanted calls and/or other audible disturbances.

Figure 3:
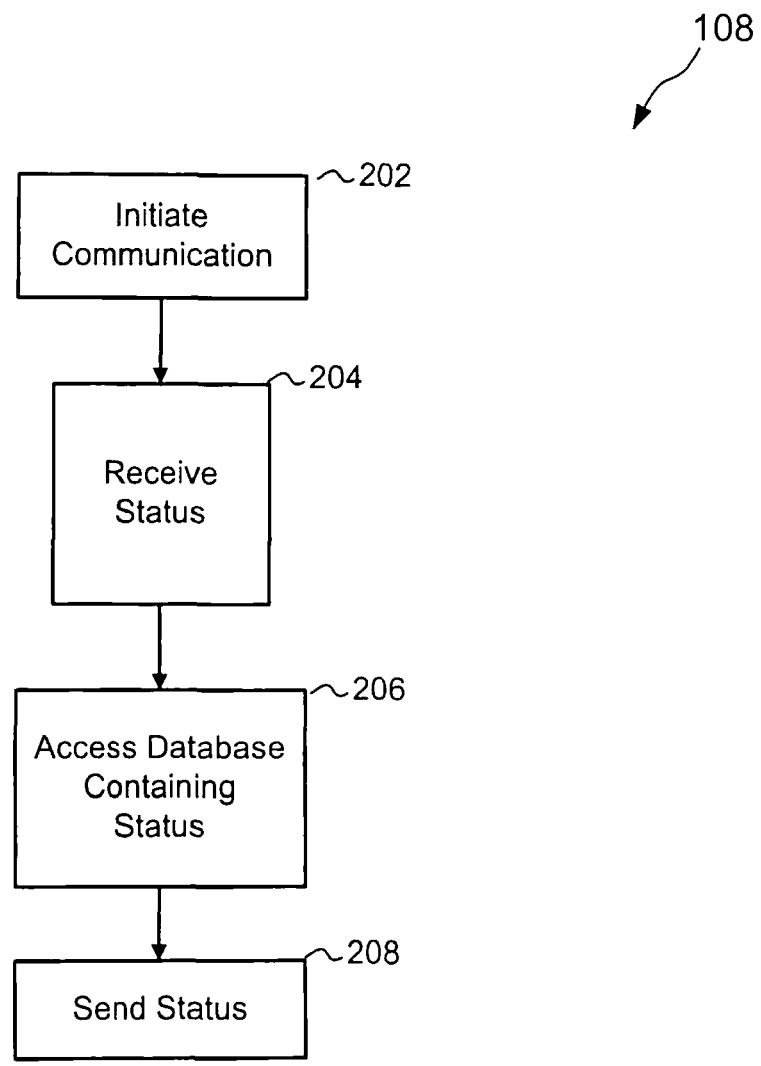
FIG. 3 is a flow diagram of a preferred embodiment of a determine call reception status step in accordance with the present invention.

In one embodiment of the invention, step 108 is performed as shown in part through FIG. 3. FIG. 3 is a flow diagram of this embodiment of step 108. In this embodiment, communications network 450 begins by initiating communication, step 202, between communications network elements within communications network 450. This communication preferably is made through out-of-band signaling. In an exemplary embodiment, a signaling system with a dedicated 64 kilobit data circuit (SS7) is used.

Figure 7:
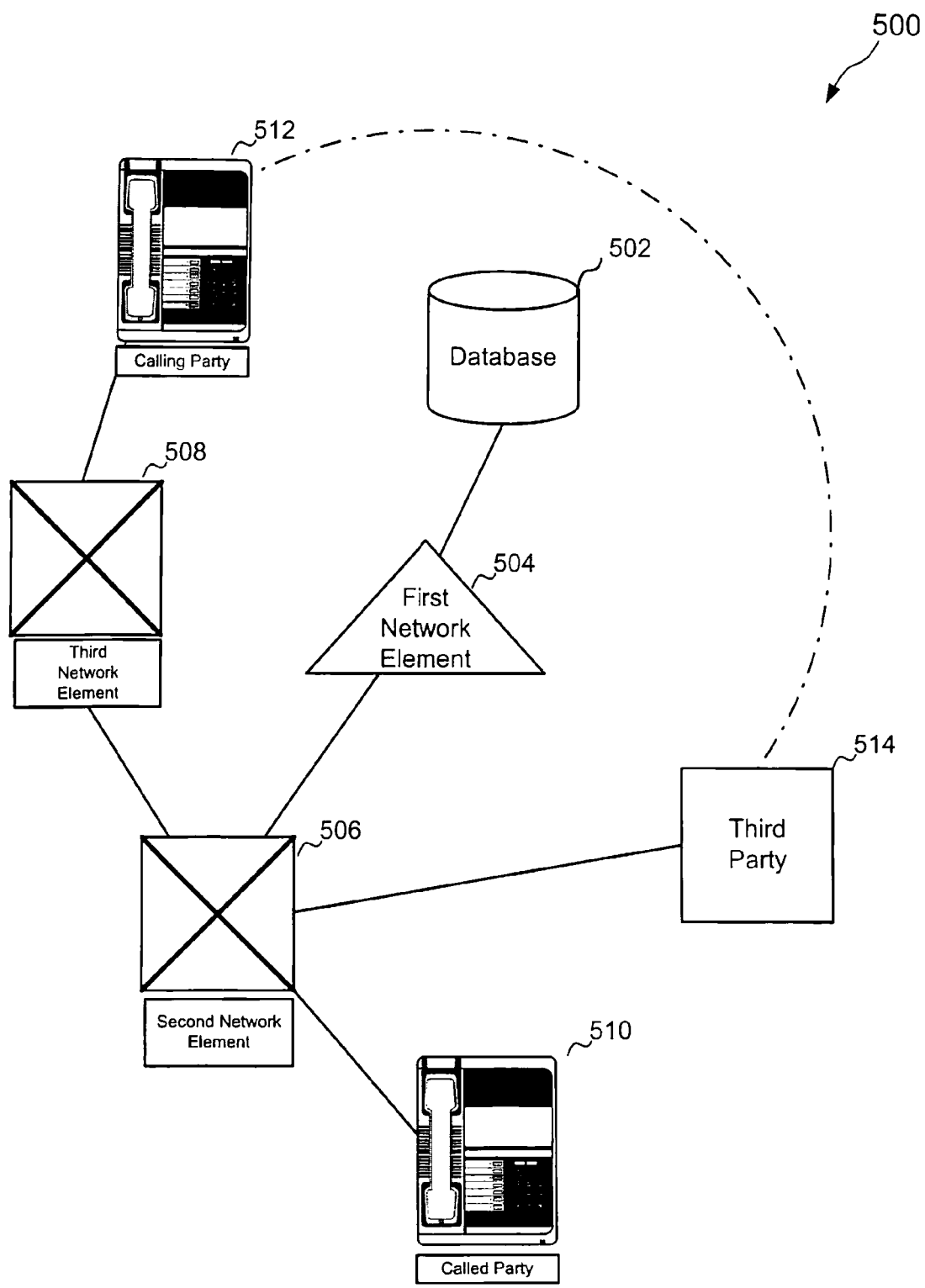
FIG. 7 is a schematic diagram of an exemplary embodiment of a system usable with a service in accordance with the present invention.

These communications network elements are preferably first communications network element 504 and second communications network element 506, as set forth in FIG. 7. Also preferably, first communications network element 504 is a Service Control Point (SCP) and second communications network element 506 is a Service Switching Point (SSP).

With communications network elements, communications network 450 determines whether or not to connect the call to called party 448 or third party 446. This flow process shown in FIG. 3 is set out for clarity in explaining one particular embodiment in which to determine to which party communications network 450 should connect the call from calling party 442, but should not be construed as limiting the present invention.

In this preferred embodiment of the invention, one communications network element communicates a query for status, step 204. Preferably this communication is in the form of a TAT trigger and a TCAP message. This query for status, step 204, prompts another communications network element to access a database containing a call reception status, step 206. In an exemplary embodiment, the database is database 502. For clarity, however, the below description often uses a database 444 shown in FIG. 6 as an example. Once the other communications network element determines called party 448's call reception status by accessing database 444, step 206, it sends the call reception status to communications network 450's element that sent the query, step 208.

In another embodiment, however, the other communications network element sends a command to communications network 450's element that sent the query, step 208. This command may include an instruction to connect or not to connect the call to called party 448, as well as other commands.

As generally set forth in FIG. 2, the call reception status of called party 448 is determined according to step 108. Based on the call reception status, communications network 450 connects the call to called party 448 or to third party 446 according to step 110.

In one embodiment, if the call reception status of called party 448 is a restricted call reception status, communications network 450 will connect the call to third party 446 according to step 106. Also in this embodiment, if the call reception status of called party 448 is not set, or is set to a non-restricted call reception status, communications network 450 connects the call to called party 448 according to step 112.

In one embodiment of the invention, step 106 is performed as shown, in part, through FIG. 4. FIG. 4 shows, in part, a flow diagram of this embodiment of step 106. In this embodiment, communications network 450 determines whether or not called party 448 has set a forwarding number, step 306. If called party 448 has set a forwarding number, or one is otherwise set, communications network 450 connects the call to the call forwarding number, step 308. (Called party 448 may also, in another embodiment, set the forwarding number after the call has been placed. This gives called party 448 the power to selectively forward calls to particular forwarding numbers.) The forwarding number may be a voicemail receiver, another telephone number of called party 448, or otherwise.

Third party 446, in this case the call forwarding number, may, in some embodiments, be a voicemail number. If called party 448 has not set the forwarding number, or one is otherwise not set, communications network 450 connects the call to a communications network element, step 310. This communications network element may, in some cases, be third party 514 shown in FIG. 7, which preferably is a service node. This communications network element may also be a personal computer, a voice mark-up language web-server, an interactive voice response system, an intelligent peripheral, or other system capable of communicating with calling party 442. The call forwarding number may, in another embodiment, be set by called party 448 after calling party 442's call is received by communications network 450.

In cases where communications network 450 connects the call from calling party 442 to third party 446, step 106, communications network 450 may, in certain embodiments, communicate further with calling party 442, step 114.

In one embodiment of the invention, communications network 450 communicates with calling party 442 according to steps 312 and 314 of FIG. 4. FIG. 4 shows, in part, a flow diagram of one embodiment of step 114. In this embodiment, communications network 450 plays an announcement to calling party 442, step 312. The announcement may be of many different types. The types may include, for example, an audible ring announcement, where calling party 442 hears a telephone ring; sounds indicating that the call is connected to a party other than called party 448; or a busy signal. Preferably the announcement will be the audible ring announcement of a set number of rings, such as nine rings, before playing a message according to step 314. Communications network 450 does not need to play a message, and instead may continuing playing the announcement indefinitely, or may disconnect called party 448 after some period of time.

In another embodiment, communications network 450 plays a message to calling party 442, step 314, after, instead of, or as part of playing the announcement according to step 312. This message may inform calling party 442 that called party 448 is not available, called party 448 is busy, called party 448 has his or her preferences set to "restricted call reception status," or otherwise. Preferably the message announces that calling party 442 is not available after a certain number of rings but does not indicate that called party 448 is not accepting calls. Preferably communications network 450 plays messages through the service node.

In an exemplary embodiment, communications network 450 plays a message received from called party 448 prior to receiving the call from calling party 442. In this embodiment, called party 448 may pre-record one or more messages. These messages may be for different purposes, some played for only particular calling parties, some played only at particular times of the day or week, some played depending on whether or to whom called party 448 is connected, or a combination of these. For example, a message received by communications network 450 and recorded by called party 448 may announce that called party 448 is not receiving calls because it is dinner time and to call back after 7 p.m. In this example, called party 448 could choose, preferably prior to communications network 450 receiving the call from calling party 442, for that particular message to be played only to calling parties not on the encumbered-line bypass list and only from 5 to 7 p.m.

FIG. 5 is a flow diagram of another preferred embodiment of a method in accordance with the present invention. Similar to the embodiments set forth in FIGS. 2, 3 and 4, this preferred embodiment includes steps of receiving a call 402 and, usually, communicating with a calling and called party 404.

This preferred embodiment may be used in conjunction with determining a call reception status 408 and restricted call reception status 410. If used in conjunction with steps 408 and 410, the steps of compare identifier 420 and identifier corresponds 422 may follow, precede, or be simultaneous with steps 408 and 410. This preferred embodiment may also be used not in conjunction with determining a call reception status 408 and restricted call reception status 410.

In one embodiment, steps 402, 404, 408, and 410 are performed before the steps of compare identifier 420 and identifier corresponds 422. Timing of steps 420 and 422 could be performed in various orders; for clarity one order of steps are set forth in the flow diagram of FIG. 5.

In this embodiment, shown in part in FIG. 5, after determining that the call reception status is set to a restricted call reception status, step 408 and 410, communications network 450 compares one or more identifiers, step 420, of calling party 442. The identifiers may include any data related to calling party 442 or the telephone number from which calling party 442 called. These identifiers may include: the telephone number from which calling party 442 called; a pass-code entered by calling party 442 or attached to calling party 442 or the number from which calling party 442 called; voice-recognition data entered by calling party 442; data within the string of data received by communications network 450 when calling party 442 made the call; data related to calling party 442 or calling party 442's telephone number known by or found out by communications network 450 by various means; or other data that identifies calling party 442.

Communications network 450 preferably performs compare identifier step 420 by comparing the identifier(s) with information within a database to determine if any identifier corresponds to the information. In one embodiment, this database is database 502. In another embodiment, this database is database 444 shown in FIG. 6. Preferably, the database used includes a CNAM (Caller ID with NAMe) database or can connect to a CNAM database in or accessible by communications network 450.

The information within database 444 may be any information by which communications network 450 may determine if the call from calling party 442 is desired by called party 448 to be connected to called party 448. In one embodiment the information is an encumbered-line bypass list and one of the identifier(s) is the telephone number from which calling party 442 called. In another embodiment the information is an encumbered-line bypass list and one of the identifier(s) is a pass-code entered by calling party 442.

In this embodiment where one of the identifier(s) is a pass-code and the information is an encumbered-line bypass list, a calling party, even if his or her telephone number is not on the encumbered-line bypass list, may enter a pass-code after making a call to called party 448. If the pass-code entered by calling party 442 matches a pass-code within the encumbered-line bypass list, communications network 450 may connect the call to called party 448 if called party 448 has not otherwise restricted the entered pass-code, such as by not allowing the call to bypass a restricted status or an encumbrance based on the time of day or week that communications network 450 received calling party 442's call.

While communications network 450 preferably performs this comparison by comparing the identifier(s) with information within database 444, communications network 450 may do so in other ways so long as these ways allow for communications network 450 to determine if one of the identifier(s) is recognized as one allowing for the call to be connected to called party 448. Communications network 450 also preferably performs this comparison using one or more communications network elements. In one embodiment, communications network 450 uses first communications network element 504. Preferably, first communications network element 504 is an SCP.

In another embodiment, second communications network element 506 communicates with first communications network element 504. These communications may take the form of a TAT trigger and a TCAP message. This communication between second communications network element 506 and first communications network element 504 may include communicating one of the identifier(s). These and all communications between communications network elements are preferably via out-of-band signaling. Communications between communications network elements are further preferred to follow SS7 protocol.

If communications network 450 compares one of the identifier(s), step 420, and it corresponds, step 422, communications network 450 connects the call to called party 448, step 412. If communications network 450 compares the identifier(s), step 420, and none correspond, step 422, communications network 450 connects the call to third party 446, step 406. As stated previously, third party 446 may include a forwarding number, a service node, or others.

In an exemplary embodiment, communications network 450 communicates with and waits to receive an assent from called party 448 to connect the call to called party 448 after performing step 422 and determining that the identifier(s) do not correspond. If communications network 450 communicates with called party 448 and does not receive the assent within a short time-period, communications network 450 proceeds to step 406. If communications network 450 communicates with called party 448 and does receive the assent within the short time-period, communications network 450 proceeds to step 412.

In another exemplary embodiment, communications network 450 communicates with and waits to receive an assent from called party 448 to connect the call to called party 448 or other instructions after performing step 422 and determining that the identifier does not correspond. These other instructions may include instructions to connect the call to a particular third party, step 406, or communicate a particular communication to calling party 442, step 414. If communications network 450 receives these other instructions, communications network 450 follows these other instructions as part of step 406 and/or step 414.

In some embodiments and usually in conjunction with connecting the call to third party 446, communications network 450 communicates with calling party 442, step 414. Communications network 450 may communicate with calling party 442, step 414, in those manners set forth above for step 114, as well as others. Communications network 450 preferably communicates with calling party 442, step 414, with a ring announcement followed by a message stating that called party 448 is not available.

In one embodiment, communications network 450 directs the call through two communications network elements. These communications network elements preferably are first communications network element 504 and second communications network element 506. Communications network 450, in this embodiment, may direct the call by the first communications network element 504 commanding the second communications network element 506 to connect the call to the called or third party. First communications network element 504 preferably is an SCP; second communications network element 506 preferably is an SSP.

Figure 6:
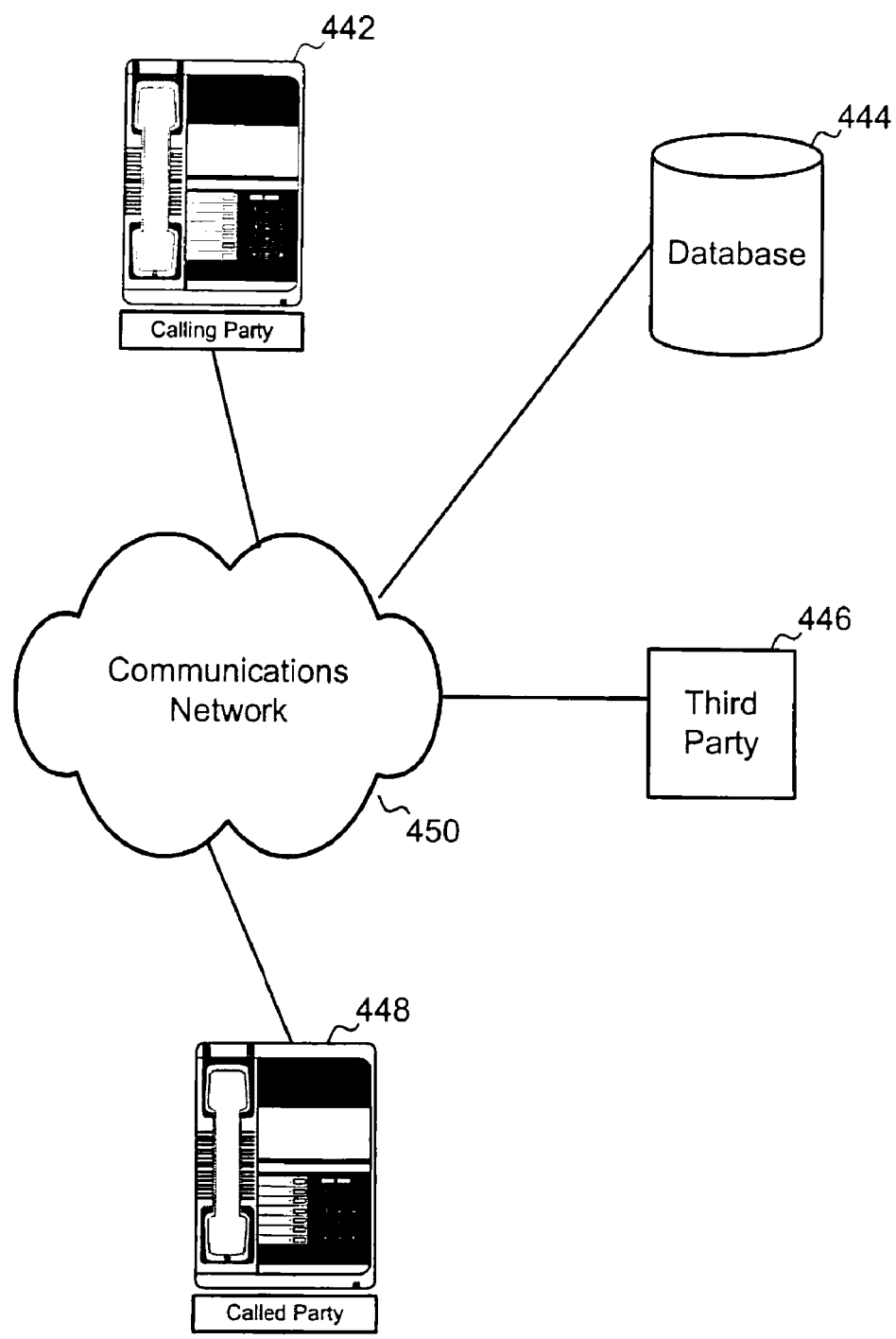
FIG. 6 is a schematic diagram of a preferred embodiment of a system usable with a service in accordance with the present invention.

FIG. 6 is a schematic diagram, portions of which show a preferred embodiment of the present invention. FIG. 6 sets forth a calling party 442, a database 444, a third party 446, a called party 448, and a communications network 450. Calling party 442, database 444, third party 446, and called party 448 are configured to communicate with communications network 450. Communications network 450 is configured to communicate with calling party 442, database 444, third party 446, and called party 448. Preferably communications network 450 is configured to receive a call from calling party 442 and then to communicate with database 444 to determine to where calling party 442 should be connected. Communications network 450 preferably is configured to connect calling party 442 to either called party 448 or third party 446 or disconnect the call. Database 444 and third party 446 are set out from communications network 450 for clarity, but may, in some embodiments, be part of communications network 450.

For example, if communications network 450 receives a call from calling party 442, who is attempting to call called part 448, communications network 450 communicates with database 444. For the restricted status service, communications network 450 is configured to communicate with database 444 to determine if called party 448 has set his or her preference to a restricted call reception status or a non-restricted call reception status.

Continuing the example, if database 444 does not show that called party 448 has set his or her call reception status set to a restricted call reception status, communications network 450 will connect calling party 442 to called party 448. If database 444 shows that called party 448 had set his or her call reception status to a restricted call reception status, communications network 450 will connect calling party 442 to third party 446 unless communications network 450 receives one or more identifiers related to calling party 442 that identifies calling party 442 as one that communications network 450 should connect by bypassing the restricted call reception status. If so, communications network 450 will connect calling party 442 to called party 448. This example is set forth for clarity in showing one possible usage of one embodiment of the invention. It should not be deemed limiting of this or any other embodiments.

FIG. 7 is a schematic diagram 500, portions of which show a preferred embodiment of the present invention. FIG. 7 sets forth multiple communications network elements 504, 506, and 508. These communications network elements are set out in this manner as a preferred embodiment of the present invention, and also as a clear way to explain the functioning of communications network 450 to which they may be a part. In other embodiments these communications network elements may be combined, or there may be fewer or additional communications network elements.

FIG. 7 sets forth the preferred embodiment of the present invention in part by setting forth a third communications network element 508, which is configured to communicate with a calling party 512 and a second communications network element 506. Preferably, third communications network element 508 is configured to communicate with calling party 512 and second communications network element 506 such that third communications network element 508 receives information from and sends information to calling party 512 and second communications network element 506. Third communications network element 508 may also be configured to connect the call to second communications network element 506.

In one embodiment, third communications network element 508 is configured to receive a call from calling party 512, which third communications network element 508 may connect to second communications network element 506. As part of the call, third communications network element 508 may create or receive identifiers of calling party 512, which are either intentionally input by calling party 512; unintentionally included, either in a string of data as part of the call or otherwise; as set forth above; or otherwise. Third communications network element 508 is preferably configured to communicate with the calling party, such as with an audible ring announcement, after receiving the call. Third communications network element 508, after receiving the call from calling party 512, preferably sends an announcement to calling party 512. This announcement is preferably a ring announcement.

FIG. 7 also sets forth the preferred embodiment of the present invention in part by setting forth a second communications network element 506, which is configured to communicate with third communications network element 508, a first communications network element 504, sometimes a third party 514, and called party 510. Second communications network element 506 communicates with third communications network element 508 as mentioned above as well as set forth below.

In some embodiments third communications network element 508 communicates identifiers of calling party 512 to second communications network element 506. In embodiments where third communications network element 508 communicates identifiers of calling party 512 to second communications network element 506, second communications network element 506 may, through communication with first communications network element 504 and indirectly with a database 502 (preferably including or connecting to a CNAM database), be configured to use such identifiers to determine whether to connect the call to called party 510 or third party 514.

In another embodiment, second communications network element 506 may, through communication with first communications network element 504 and indirectly with a database 502, be configured to determine whether to connect the call to called party 510 or third party 514. In this embodiment, second communications network element 506 preferably relays the identity of called party 510 to first communications network element 504. Second communications network element 506 preferably communicates with third communications network element 508 to gain the identity of called party 510, but may do so in any manner.

Second communications network element 506 also is configured to communicate in other manners with first communications network element 504. Preferably, second communications network element 506 communicates with first communications network element 504 through one or more queries. These queries may request information. Preferably these queries are communicated through a signaling function for communications network databases such as a Transaction Capabilities Application Part (TCAP). These queries may also include data and other information, such as the identity of called party 510, or various identifiers of calling party 512.

In one embodiment, these queries preferably request first communications network element 504 to determine, using the identity of called party 510, a call reception status of called party 510. With this call reception status, second communications network element 506 preferably may, either on its own or as a command from first communications network element 504, connect the call to called party 510 or third party 514.

In another embodiment, these queries preferably request first communications network element 504 to determine whether one or more of the identifiers of calling party 512 correspond to an encumbered-line bypass list. With this correspondence or lack of correspondence, second communications network element 506 preferably may, either on its own or as a command from first communications network element 504, connect the call to called party 510 or third party 514.

In still another embodiment, these queries request first communications network element 504 to determine, using the identity of called party 510 and identifiers of calling party 512, a call reception status of called party 510 and any correspondence between one or more identifiers of calling party 512 to an encumbered-line bypass list. With this call reception status and correspondence, second communications network element 506 preferably may, either on its own or as a command from first communications network element 504, connect the call to called party 510 or third party 514. First communications network element 504 may also be configured to connect the call to called party 510 or third party 514.

Preferably, second communications network element 506 connects the call to the called party if called party 510's call reception status is set to a non-restricted call reception status. Also preferably, second communications network element 506 connects the call to called party 510 if one or more of the identifiers of calling party 512 corresponds to information within the encumbered-line bypass list. Second communications network element 506 preferably connects the call to third party 514 in cases above where second communications network element 506 does not connect the call to called party 510, shown by the dashed line in FIG. 7.

Second communications network element 506 also is configured to communicate with third party 514, as set forth above and additionally below. Second communications network element 506 also may communicate with third party 514, providing information to third party 514, such as how long calling party 512 remains on the line, the calling party's telephone number and name, and the like. Such information may be stored at third party 514. Second communications network element 506 preferably communicates with third party 514 to connect the call from calling party 512 to third party 514. Second communications network element 506 may also command third party 514 or third party 514 may be programmed to perform, in cases where third party 514 is a fourth communications network element or the service node, to play particular announcements or messages to calling party 512. Preferably, third party 514, when the fourth communications network element or the service node, plays a ring announcement, followed by a message. Preferably the message informs calling party 512 that called party 510 is not available. Third party 514 may, however, plays many types of messages, either chosen by communications network 450 or by called party 510.

Second communications network element 506 also is configured to communicate with called party 510, as set forth above and additionally. Second communications network element 506 preferably communicates identifiers of calling party 512 to called party 510. Second communications network element 506 does so preferably inaudibly so as not to disturb called party 510. In an exemplary embodiment, second communications network element 506 communicates identifiers of calling party 512 through a text-based display, such as a liquid crystal display. In another exemplary embodiment, second communications network element 506 communicates identifiers of calling party 512 through a test-based display without any audible communication, such as called party 512's telephone ringing.

FIG. 7 also sets forth the preferred embodiment of the present invention in part by setting forth first communications network element 504, which is configured to communicate with second communications network element 506 and a database 502, and vice-versa. First communications network element 504 communicates with second communications network element 506 as mentioned above. First communications network element 504 also communicates with database 502. In one embodiment, first communications network element 504 preferably compares or has database 502 compare one or more identifiers of calling party 512 with information in the encumbered-line bypass list, which is contained with database 502. In another embodiment, first communications network element 504 preferably compares or has database 502 compare the identity of called party 510 to determine the call reception status of called party 510. In some embodiments, first communications network element 504 performs both of the above comparisons.

In the embodiment previously discussed, communications network 450 restricts calls from connecting to a called party that subscribes to the restricted status service. Communications network 450 also provides features where certain calls bypass the restricted status service, as well as other services and/or features that encumber a telephone line, by connecting calls to the called party even though the called party's line is encumbered.

In other embodiments, first communications element 504 may include a personal computer, a voice mark-up language web-server, an interactive voice response system, or other system capable of performing the functions set forth for first communications element 504.

An encumbered line or line encumbrance is a line or a connection that is in a condition or state that is less than optimally available. Optimally available is a condition or state where access to the line is absolutely uninhibited. Some examples of encumbered lines include the following: a busy line, a line that is currently in use, a line that has been configured to prevent access by calling parties, a line where a service provider is controlling access to the line by preventing or modifying at least one calling party's ability to access, use, or connect with the encumbered line.

Figure 8:
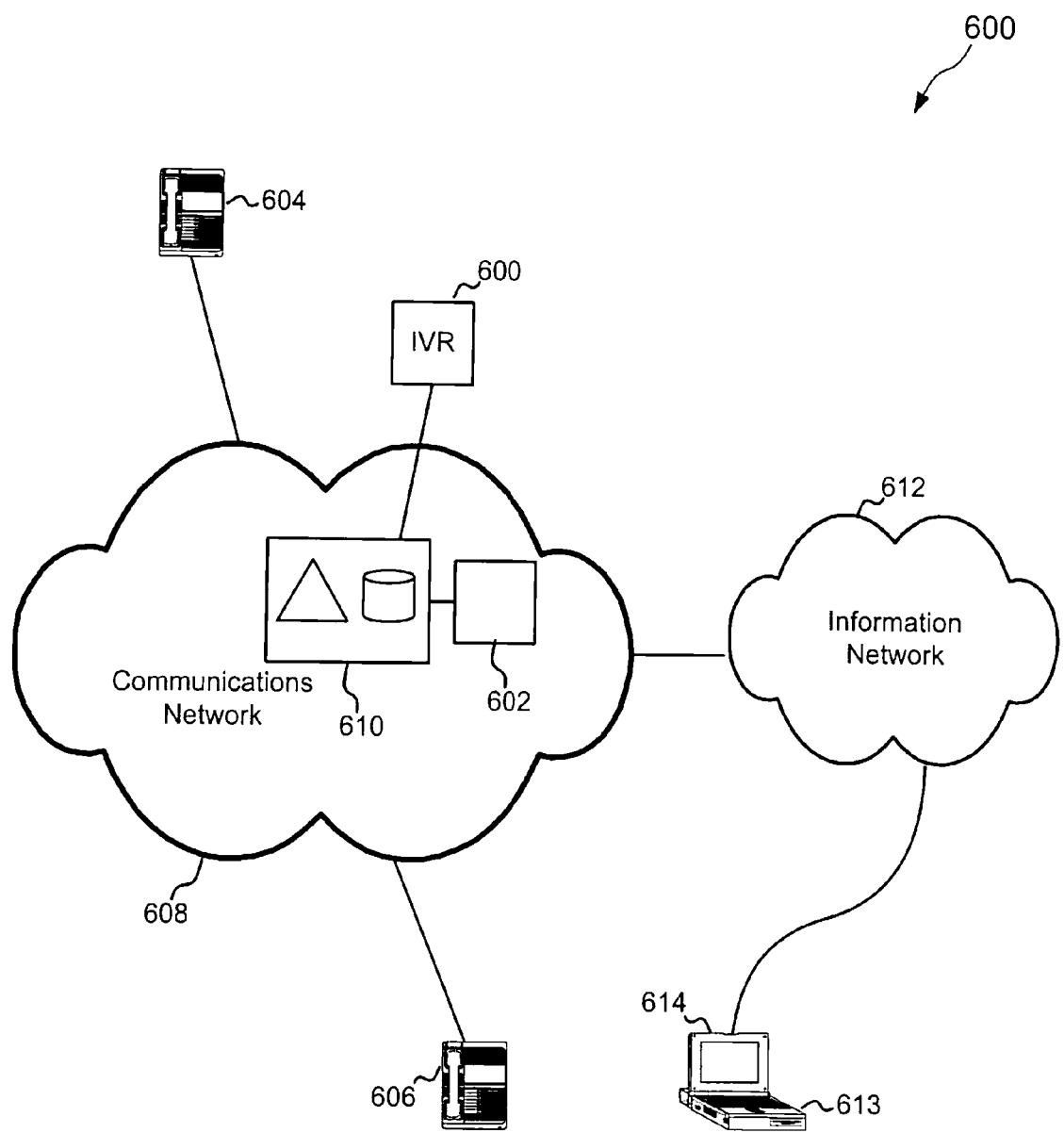
FIG. 8 is a schematic diagram of a preferred embodiment of an interface system in accordance with the present invention.

FIG. 8 and other figures described below set forth ways in which a subscriber of the encumbered-line bypass feature can provision his or her preferences for this feature. In an exemplary embodiment below, the figures and description describe how the subscriber can provision aspects of the encumbered-line bypass feature such as which calling party's calls are connected and during what times of the day or week. With these preferences provisioned, the communications network may selectively connect calls to the subscriber even when the subscriber's line is encumbered.

FIG. 8 is a schematic diagram, portions of which show a preferred embodiment of the present invention. FIG. 8 describes two systems by which a subscriber can provision his or her encumbered-line bypass feature, as well as the restricted status service and other communications services. Other systems could be used to provision these services and feature, but for clarity, FIG. 8 includes an interactive voice response (IVR) system 600 and an interface system 602.

Interface system 602 may be a computer system, one or more parts of a computer, one or more computers acting together, software on a computer or any other system that can manage information. Interface system 602 preferably is configured to allow a subscriber of restricted status, encumbered-line bypass, and/or other communications network services to receive and/or input information into an information manager 610. Preferably, interface system 602 includes a firewall. Interface system 602 preferably is a secure advanced intelligent communications network intranet. Interface system 602 may, however, be a secure intelligent communications network intranet, a secure communications network intranet, a secure intranet, an intranet, or any device capable of communicating information between communications network 608 and information network 612.

Interface system 602 preferably communicates information regarding status, settings and/or preferences and can also provide the information in a format appropriate for whatever device the subscriber is using. As an example, interface system 602 can display an existing encumbered-line bypass list of telephone numbers and pass-codes in columns, allowing easy deletion from the list or adjustment to the details, bypass times, or other information related to each telephone number and pass-code on the encumbered-line bypass list.

The following example, disclosed in connection with this embodiment, demonstrates features of the present invention. A calling party 604 calls a called party 606. A communications network 608 receives the call from calling party 604. After receiving the call, communications network 608 determines whether or not called party 606's line is encumbered. Communications network 608 preferably determines whether called party 606's line is encumbered. In some cases information manager 610 assists with this determination.

Information manager 610 may be a computer system, one or more parts of a computer, one or more computers acting together, software on a computer, or any other system that can manage information and is communication with communications network 608. In some cases information manager 610 can form a portion of communications network 608.

If communications network 608 determines that called party 606's line is encumbered, communications network 608 determines whether or not called party 606 subscribes to an encumbered-line bypass feature. Communications network 608 may determine whether called party 606 subscribes to the encumbered-line bypass feature before, after, or at the same time communications network 608 determines if called party 606's line is encumbered.

In this embodiment, if called party 606's line is encumbered and called party 606 subscribes to the encumbered-line bypass feature, communications network 608 determines whether or not calling party 604 may bypass the encumbrance and thus be connected to called party 606.

Communications network 608 preferably determines whether or not to connect calling party 604 based upon called party 606's preferences for the encumbered-line bypass feature.

Preferably before calling party 604 made the call to called party 606, however, called party 606 established his or her preferences and determined which calling parties would bypass an encumbrance to called party 606's line. In an exemplary embodiment, called party 606 may choose which parties would bypass and at what times of the day or week based on the telephone number from which they call or their entry of a certain pass-code.

In a preferred embodiment, as shown in FIG. 8, called party 606 may provision his or her encumbered-line bypass feature through IVR system 600 and/or the interface system 602.

In one embodiment, called party 606 may contact IVR system 600 through a telephone call to the system, and through IVR system 600 set his or her preferences. These preferences may include telephone numbers of potential calling parties that may bypass an encumbrance as well as pass-codes whereby calling parties may bypass an encumbrance. These preferences may also include times of the day that potential calling parties may bypass encumbrances and other times or days that certain potential calling parties may not bypass encumbrances.

In this embodiment, IVR system 600 communicates with information manager 610. Information manager 610 preferably is part of communications network 608. Information manager 610 may also be separate from communications network 608. Preferably communications network 608 may communicate with information manager 610 to determine the preferences of called party 606.

In another embodiment, called party 606 may contact interface system 602. Preferably called party 606 communicates with interface system 602 through an information network 612. Information network 612 may be a global Internet, an extranet, and intranet, or any other information network.

Called party 606 communicates with information network 612 with communication device 613. Communication device 613 may be a computer a wireless device, or any device allowing a person to communicate with an information network. Preferably these devices allow for the display of a monitor screen 614.

Called party 606's preferences may include telephone numbers of calling parties that may bypass an encumbrance as well as pass-codes whereby calling parties may bypass an encumbrance. These preferences may also include times of the day that potential calling parties may bypass encumbrances and other times or days that certain potential calling parties may not bypass encumbrances, well as other options.

With called party 606's preferences accessible by communications network 608, when calling party 604 calls and called party 606's line is encumbered, communications network 608 may, through communication with information manager 610, ascertain whether or not called party 606 wishes calling party 604 to be connected to called party 606's telephone line.

Figure 10:
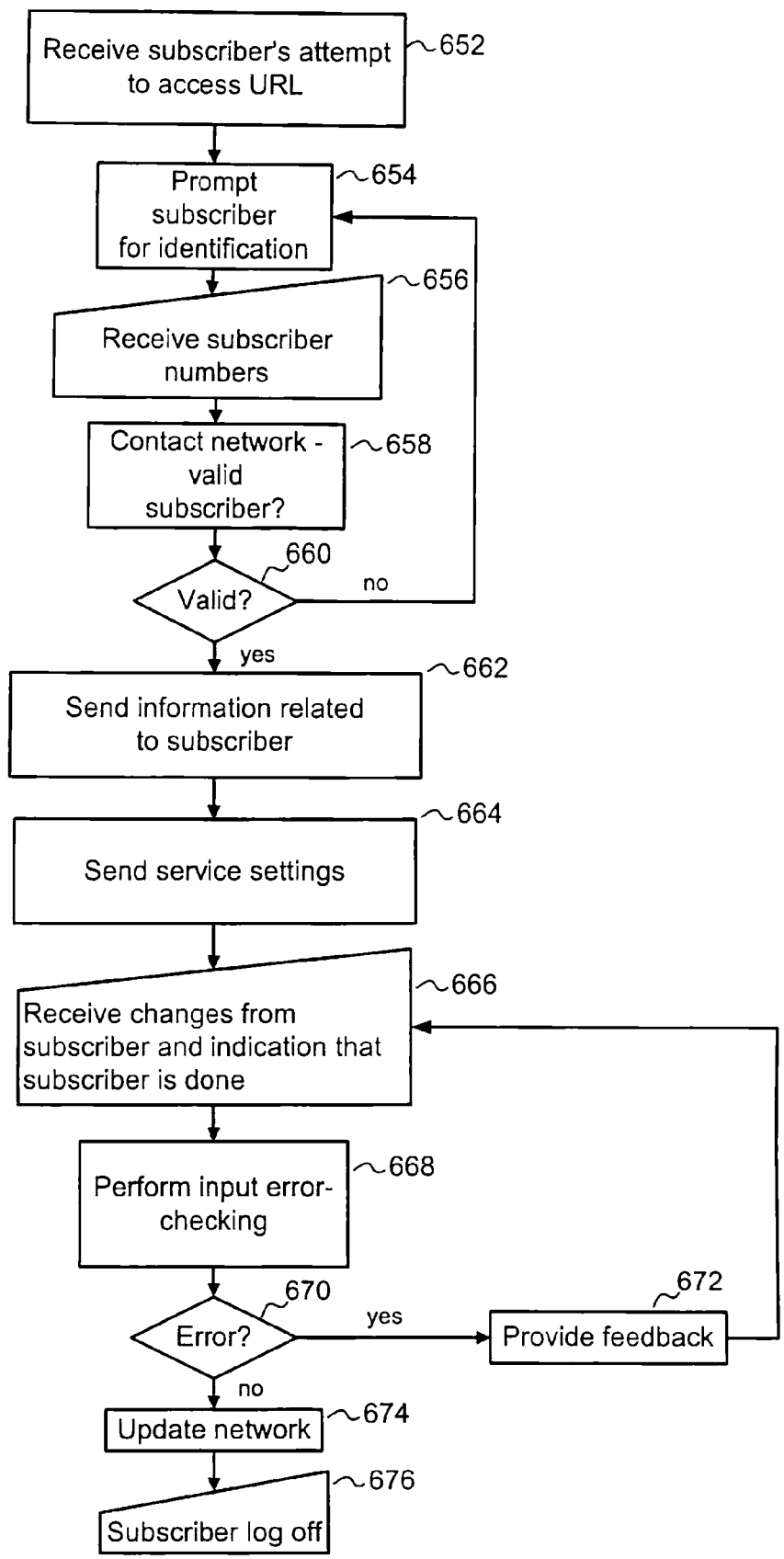
FIG. 10 is a flow diagram of a preferred embodiment of an interface system and method in accordance with the present invention.

FIG. 9 is a schematic diagram, portions of which show a preferred embodiment of the present invention. FIG. 10 describes, by way of example, an exemplary embodiment of interface system 602.

Preferably before a first calling party 620 or a second calling party 622 calls called party 606, called party 606 establishes his or her encumbered-line bypass features and options. Screen 614 shows an example of information sent from interface system 602 to called party 606's communication device 613.

In this embodiment, interface system 602 sends information to called party 606. Communication device 613 displays through screen 614, called party 606's times of the day that called party 606's line is set to a restricted status or is otherwise encumbered. Screen 614 shows an exemplary embodiment, showing called party 606 a graph 624 of the hours in a day, including those where called party 606's line is encumbered and unencumbered. Screen 614 also shows an "on setting" and an "off setting," either of which may be used to override the restricted and non-restricted statuses shown in graph 624. Preferably interface system 602 sends information such that communication device 613 displays this graph in varying colors, such that called party 606 may easily discern which times of the day called party 606's line is encumbered.

In the example show in graph 624, called party 606's line is encumbered from 10:30 p.m. to 7:00 a.m. and from 5:00 p.m. to 7:00 p.m. Neither the on setting or the offsetting are chosen. Recall that one example of an encumbered line is a call blocking feature where incoming calls are either sent to another number, or a signal is sent to the calling party indicating the unavailability of the called party. While not shown, interface system 602 may send information such that the communication device displays multiple graphs representing times for each day of the week or month that called party 606's line is encumbered.

Preferably called party 606 also may communicate with interface system 602 using screen 614 to select preferences for the encumbered-line bypass feature. A portion of screen 614 includes a list 626 of telephone numbers. Another portion of screen 614 includes pass-codes. In addition to the telephone numbers and pass-codes, additional fields of data may be presented. For example, a name or other detail associated with the telephone number or pass-code, as well as other information may also be included, as shown in the example in FIG. 9, screen 614.

As shown in FIG. 9, called party 606 has established certain preferences for his or her encumbered-line bypass list. Specifically, calls from telephone numbers 404-555-1111 and 404-555-3333 have been selected as telephone numbers to bypass encumbrances on called party 606's line during certain times of the day or week, shown under "Bypass Times".

Given these preferences, if either a first calling party 620, having a telephone number of 404-555-1111, or a second calling party 622, having a telephone number of 404-555-2222, calls called party 606 at 1 p.m. both will be connected to called party 606 unless called party 606's line is encumbered is some way, for example, if the line is busy. This is because, as shown in graph 624, the called party has not chosen to selectively restrict or otherwise encumber his or her line to prevent unwanted calls at 1 p.m. Because called party 606's line is not encumbered at 1 p.m., first calling party 620 and second calling party 622 may be connected by communications network 608. This is true even though second calling party 622 is not on called party 606's encumbered-line bypass list 626.

As another example, if either the first calling party 620 or the second calling party 622 calls called party 606 at 3 a.m. second calling party 622 will not be connected to called party 606 because called party 606 has selected his or her line to be encumbered at 3 a.m., as shown in graph 624, and because second calling party 622's telephone number is not on called party 606's encumbered-line bypass list 626. First calling party 620, however, may be connected because calling party 620's telephone number is on encumbered-line bypass list 626, and called party 606 has designated first calling party 620 as a party that should be connected despite encumbrances. Another caller calling from 404-555-3333, shown in list 626, may not be connected by virtue of the telephone number from which she called if she calls at 3 a.m., because her bypass times only allow bypass of an encumbrance from 8 a.m. to 10 p.m.

As yet another example, if any calling party, regardless of whether the calling party is or is not on the encumbered-line bypass list, calls called party 606 at 3 a.m. and enters pass-code 44444, they will bypass the encumbrance. Calling parties entering pass-code 22222, however, will only bypass an encumbrance if the encumbrance exists between 8 a.m. and 6 p.m.

Each of these preferences, whether they be set to times of a restricted call reception status (an example of an encumbrance) and a non-restricted call reception status, an on setting or offsetting, telephone numbers and pass-codes for an encumbered-line bypass list, names and/or details associated with the telephone numbers and pass-codes, and the bypass times for each telephone number and pass-code, may be modified by the subscriber as set forth in FIG. 10.

FIG. 10 is a flow diagram of a preferred embodiment of a method in accordance with the present invention. This method includes preferred steps of an interface system 602 (see FIG. 9). This method of using an interface system 602 allows a communications network to receive information from a subscriber of restricted status service and encumbered-line bypass feature and/or other services. This communications network may be the communications network discussed above and shown in part in FIG. 6, 7, 8, or 9, or another type of communications network or system. The interface system may be the interface system discussed above and shown in part in FIG. 8, or may be another type of interface system facilitating communication between a communications network and a subscriber.

As part of this preferred embodiment, in step 652 the interface system receives a subscriber's attempt to access a URL to communicate with the communications network. Typically, subscribers attempt to access the URL to update a particular service, but may do so for other reasons. Services may include a restricted status service, another service capable of encumbering a telephone line, or another type of service.

Proceeding with the preferred embodiment of the method, in step 654, the interface system prompts a probable subscriber for identifying data. The interface system then receives identifying data. Preferably the home, landline telephone number and corresponding ID code or password from the subscriber are received in step 656. Once the interface system has received the identifying data, the interface system determines if the probable subscriber is a subscriber of the service to which the probable subscriber is attempting to update. Preferably, the interface system does so through a query to an intelligent peripheral in communication with the communications network to validate whether or not the identifying data corresponds with an identifying-data record, step 658. If the probable subscriber is considered to be a valid subscriber, step 660, the preferred method proceeds to step 662.

If the subscriber is not validated to be a valid subscriber of the system, step 660, the interface system returns to step 654 to repeat steps 654, 656, 658, and 660, or denies access to potential the subscriber.

The interface system then sends information to the subscriber regarding that subscriber's current services and preferences. The interface system does so according to step 662 in order to allow the subscriber to review, access, update, and otherwise communicate regarding the service information presented to the subscriber.

Proceeding to step 664, the interface system sends subscriber-based service settings. These service settings can then be displayed, reviewed, and modified by the subscriber. Preferably, these service settings can include stored or default encumbered-line bypass list data, forwarding numbers, passcodes, and an on or off setting for the entire service. The stored or default encumbered-line bypass list data preferably includes telephone numbers and pass-codes stored in the stored encumbered-line bypass list data. In an exemplary embodiment, the stored or default encumbered-line bypass list data is presented to the subscriber through the interface system in an easy-to-update table. These service settings also preferably include applicable categories and/or links. Further, these service settings and/or applicable categories or links data are related to one or more services to which the subscriber subscribes. As part of step 664, the interface system may also send information related to services to which the subscriber does not yet subscribe.

In an exemplary embodiment the interface system sends one or more call markers relating to one or more telephone calls made from or received by the subscriber to the subscriber through the interface system. Preferably, the call markers include the telephone number of one or more parties that called or were called by the subscriber. Also preferably, the call markers include a caller identification of a party that called or was called by the subscriber. The caller identification may include the calling party's name, location from which the calling party called, a timestamp of the time a party called or was called by the subscriber, or otherwise.

This information is provided by the interface system such that the subscriber may access this information through various devices and through a communications network. These various devices may include a computer, a hand-held device, a wireless device or some other device capable of communicating with the interface system. Through making information available to these devices, the interface system may allow the subscriber to easily make changes to the services.

In step 666, the interface system receives desired changes from the subscriber, which may include new data on changes to the subscriber's encumbered-line bypass list, other preferences shown on screen 614, or other preferences and options discussed or implied herein. Preferably, such changes may be completed with a minimum number of keystrokes. In an exemplar embodiment, the subscriber may click on each call marker listed in a table (step 664) to add that telephone number to his or her encumbered-line bypass list, along with associated details to an accompanying name/detail list. Also preferably, the interface system allows the subscriber to add services and other features and details. The interface system then waits to receive such changes or an indication that the subscriber has completed his or her communication.

The interface system then, in step 668, checks for errors in the inputs received from the subscriber. After doing so, if there are errors in information input from the subscriber, step 670, the interface system provides feedback, step 672, and performs steps 666, 668, and 670 to receive corrected information. If there are no errors, step 670, the interface system updates the communications network by storing preferences, including the preferences associated with the encumbered-line bypass list, and other data into a database accessible by the communications network, step 674. In an exemplary embodiment, the interface system sends an update to a communications network element, an intelligent peripheral, or an SCP, which then updates the database. After doing so, the interface system logs the subscriber off the interface system, step 676.

Figure 11:
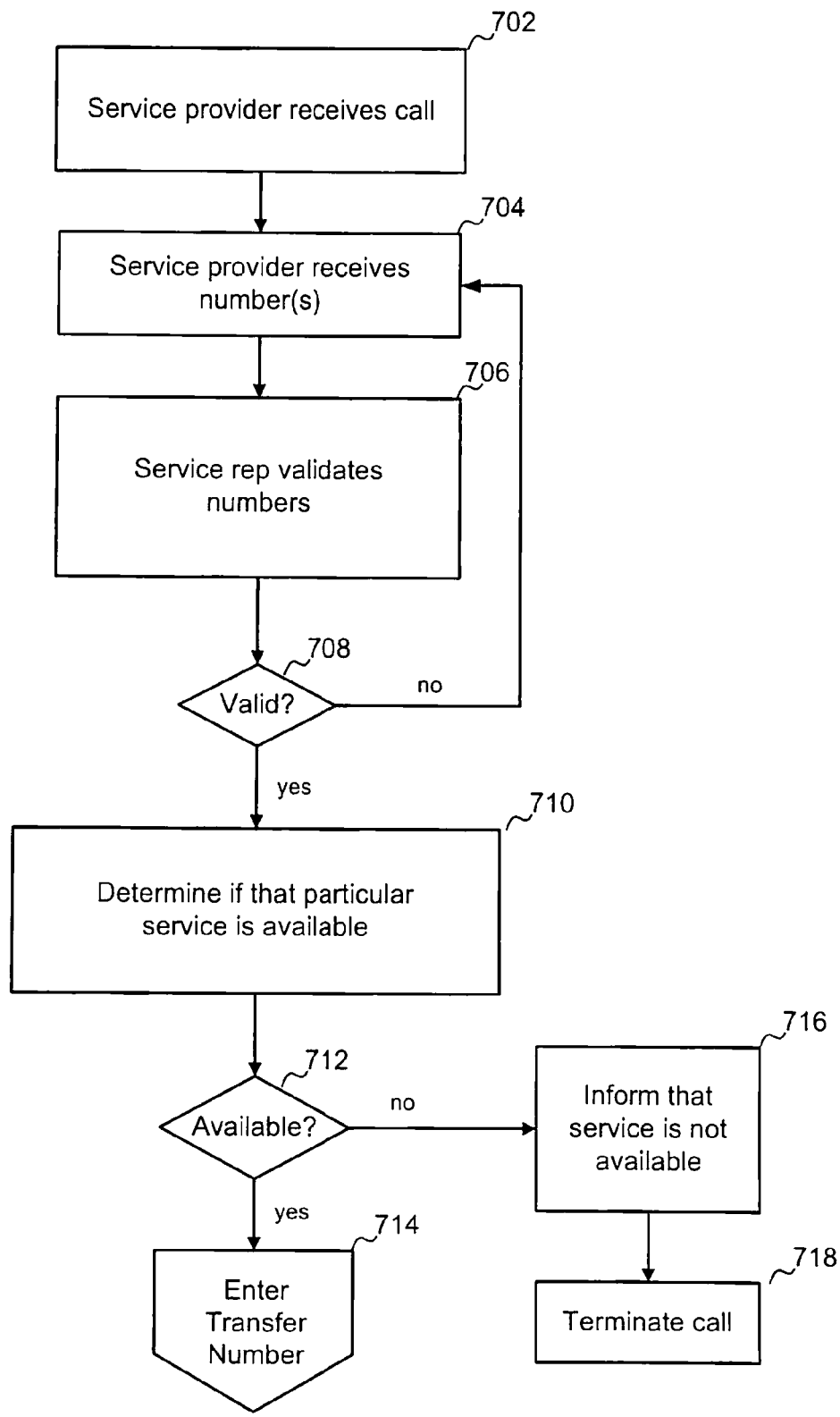
FIG. 11 is a flow diagram of a preferred embodiment of an IVR-based method in accordance with the present invention.
Figure 12:
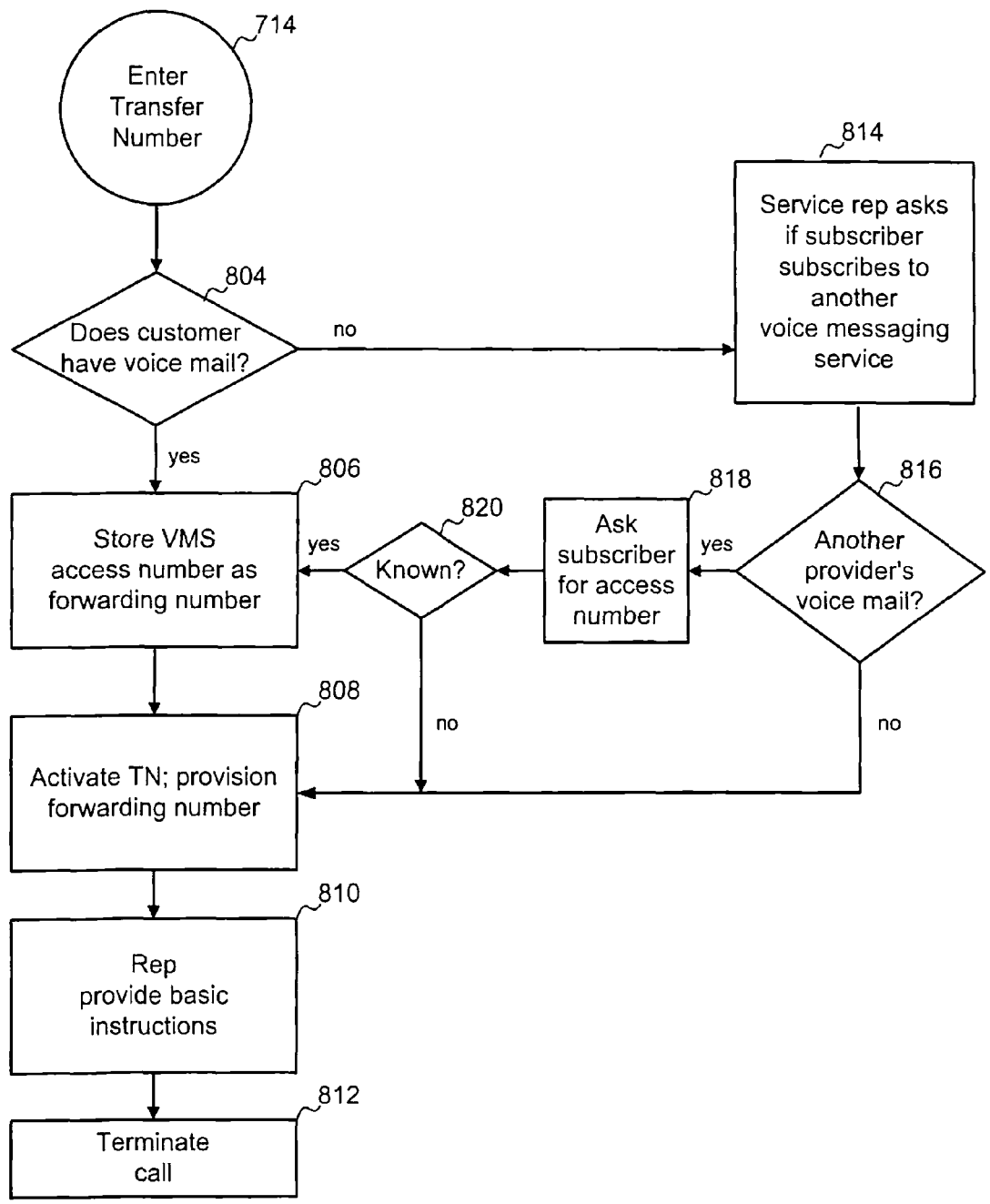
FIG. 12 is a flow diagram of a preferred embodiment of an enter transfer number method in accordance with the present invention.

FIGS. 11 and 12 are flow diagrams showing one example of a preferred embodiment of a method in accordance with the present invention. This example includes operating steps of an interactive voice response (IVR system) system or with human-to-human communication (HTH). Many other manners of using an IVR system with or without HTH may be used in accordance with the preferred embodiment of this method.

As part of this example, the steps shown in FIGS. 11 and 12 may be completed by an agent of the service provider, such as a service representative, or through the IVR system. Preferably, those steps not specifically referring to use of a service representative are completed through the IVR system. This method of using this IVR system and HTH allows a subscriber (or probable subscriber) of restricted status, encumbered-line bypass, and/or other communications network services to receive from and/or input information into a communications network. This communications network may be the communications network discussed above and shown in part in FIG. 6, 7, 8, or 9, or another type of communications network or system.

In step 702, a service provider receives a call from a potential subscriber intending to order or modify service. The service provider then receives information, in some cases, one or more numbers from the potential subscriber 704. These numbers are preferably a landline telephone number and an authorization code from the potential subscriber. After receiving the numbers, the service representative attempt to validate one or more of the potential subscriber's numbers against a subscriber record database, step 706. If the information received is valid, step 708, an attempt is made to validate that the service is available in the subscriber's area, step 710.

The service representative attempts to validate that the service is available in the subscriber's area by comparing the area against a deployment database, step 710. If the service is not available, step 712, the system informs the subscriber that the service is not available, step 716. The service representative then terminates the call from the subscriber, step 718.

If, on the other hand, the service is available, step 712, the service representative asks that the subscriber enter a transfer number, according to the method set forth after step 714 (see FIG. 12).

Continuing with the preferred embodiment from step 714, FIG. 12 sets forth a preferred embodiment of a method to enter a transfer number. Entering a transfer number may be performed in other ways as well. In this embodiment, however, the service provider receives the transfer number entered by the subscriber, according to the method set forth after step 714.

If the subscriber does subscribe to the service provider's voice messaging service, step 804, the service provider stores the voice messaging service (VMS) access number as a forwarding number. Preferably the service provider performs step 802 via a computer query to a database. If the subscriber does not, step 804, the service representative asks the subscriber if the subscriber subscribes to another service provider's voice messaging service, step 814.

If the subscriber subscribes to another provider's voicemail, step 816, the service provider asks the subscriber for the appropriate number, step 818. If the service provider receives the access number from the subscriber, step 820, the service provider then proceeds according to step 806. In step 806, the service provider stores the voice-messaging service access number as the forwarding number.

If, on the other hand, the service provider does not receive an access number from the subscriber, step 816, the service provider proceeds according to step 808.

In step 808, the service provider activates the transfer number and activates the service for the subscriber's landline telephone number. The service provider preferably activates the transfer number in a communications network element, such as a service node. If the voice mail number or voice mail access number is not received, the service provider activates the number of a service node. In an exemplary embodiment, the forwarding number is a special number the service provider uses to transfer calls to a service node.

Then the service provider, in step 810, provides basic service instructions as to how the subscriber is to update the service. After so providing basic instruction, the service provider terminates the call with the subscriber, step 812.

FIGS. 13-16 are flow diagrams showing examples of preferred embodiments of a method in accordance with the present invention. These figures and the description set forth below describe a method whereby an Interactive Voice Response (IVR) system interacts with a subscriber.

This method of using this IVR system allows a subscriber of network services, including, for example, restricted status or encumbered-line bypass, to interact with a service provider. This communications network may be the communications network discussed above and shown in part in FIG. 6, 7, 8, or 9, or another type of communications network or system benefiting from input or output through an IVR system.

In step 1002 the IVR system receives identifying data from the subscriber. Preferably this data is based on the telephone number from which the subscriber is calling, or a subscriber-code that the subscriber enters. After receiving the identifying data from the subscriber, the IVR system validates, in step 1004, the subscriber as a subscriber of a service by comparing the identifying data with an identifying-data record. The identifying-data record is preferably stored in a database accessible by the communications network.

If the IVR system validates the subscriber, the IVR system proceeds to main menu step 1008. In step 1008 the IVR system prompts the subscriber and preferably provides the following choices: (1) turn the service on or off; (2) set schedule for the service; (3) set encumbered-line bypass list; or (4) select a forwarding number. Preferably, these choices are associated with appropriate digits, digits 1 through 4 are given as one possible example.

If the IVR system receives a one digit from the subscriber according to step 1010, the IVR system performs a query to determine the service status step 1012. The IVR system, once it has determined the service status, announces the status to the subscriber according to step 1014. After announcing the status, the IVR system sends this new status to the communications network, preferably to an intelligent peripheral of the communications network, and in an exemplary embodiment an SCP, according to step 1016. The IVR system then returns, in step 1018, to the main menu 1008.

With the above steps proceeding from step 1008 described, the following sets forth another set of steps potentially proceeding from step 1008. If the IVR system receives a two-digit 1020, the IVR system proceeds to step 1022. The IVR system queries the communications network, preferably an intelligent peripheral of the communications network, and in an exemplary embodiment an SCP of the communications network, to retrieve the appropriate schedule. The IVR system then proceeds to step 1024. If the schedule exists, the IVR system proceeds to step 1026. If it does not then the IVR system proceeds to step 1036 in order for the IVR system to receive numbers entered by the subscriber.

If the schedule exists, according to step 1024, the IVR system plays the schedule, step 1026, to the subscriber. The IVR system then prompts the subscriber to either keep or change the schedule that has just been played back to the subscriber, step 1028.

The IVR system waits to receive and then receives and collects a digit from the subscriber, either one or two in this case, step 1030. If the IVR system receives or collects a one-digit, step 1032, the IVR system returns to the main menu, step 1018. If the IVR system collects a two-digit according to step 1034 it proceeds to step 1036.

With the above steps proceeding from step 1008 described, the following sets forth another set of steps potentially proceeding from step 1008. If the IVR system receives a three-digit, step 1038, the IVR system queries the communications network for the encumbered-line bypass list according to step 1040. Preferably the IVR system queries an intelligent peripheral of the communications network. In an exemplary embodiment the IVR system queries an SCP of the communications network to retrieve the appropriate encumbered-line bypass list. After step 1040, the IVR system proceeds step 1042, described in FIG. 15.

With the above steps proceeding from step 1008 described, the following sets forth another set of steps potentially proceeding from step 1008. If the IVR system receives a four-digit, the IVR system queries the communications network for a transfer number in step 1046. Preferably the IVR system queries an intelligent peripheral of the communications network. In an exemplary embodiment the IVR system queries an SCP of the communications network. After step 1046, if a number does not exist in step 1048, the IVR system proceeds to step 1062.

If the number does exist, the IVR system plays the number to the subscriber, step 1050. After playing the number, the IVR system, according to step 1052, prompts the subscriber to keep or change the number. The IVR system then waits to receive, for example, either a one-digit or a two-digit from the subscriber, according to step 1054. If the IVR system receives a one-digit from the subscriber, step 1056, the IVR system returns to the main menu according to step 1058. If the IVR systems receives and/or collects a digit according to step 1054 and if the digit is two-digit, step 1060, the IVR system proceeds to step 1062, which leads to FIG. 14 discussed below.

Figure 13:
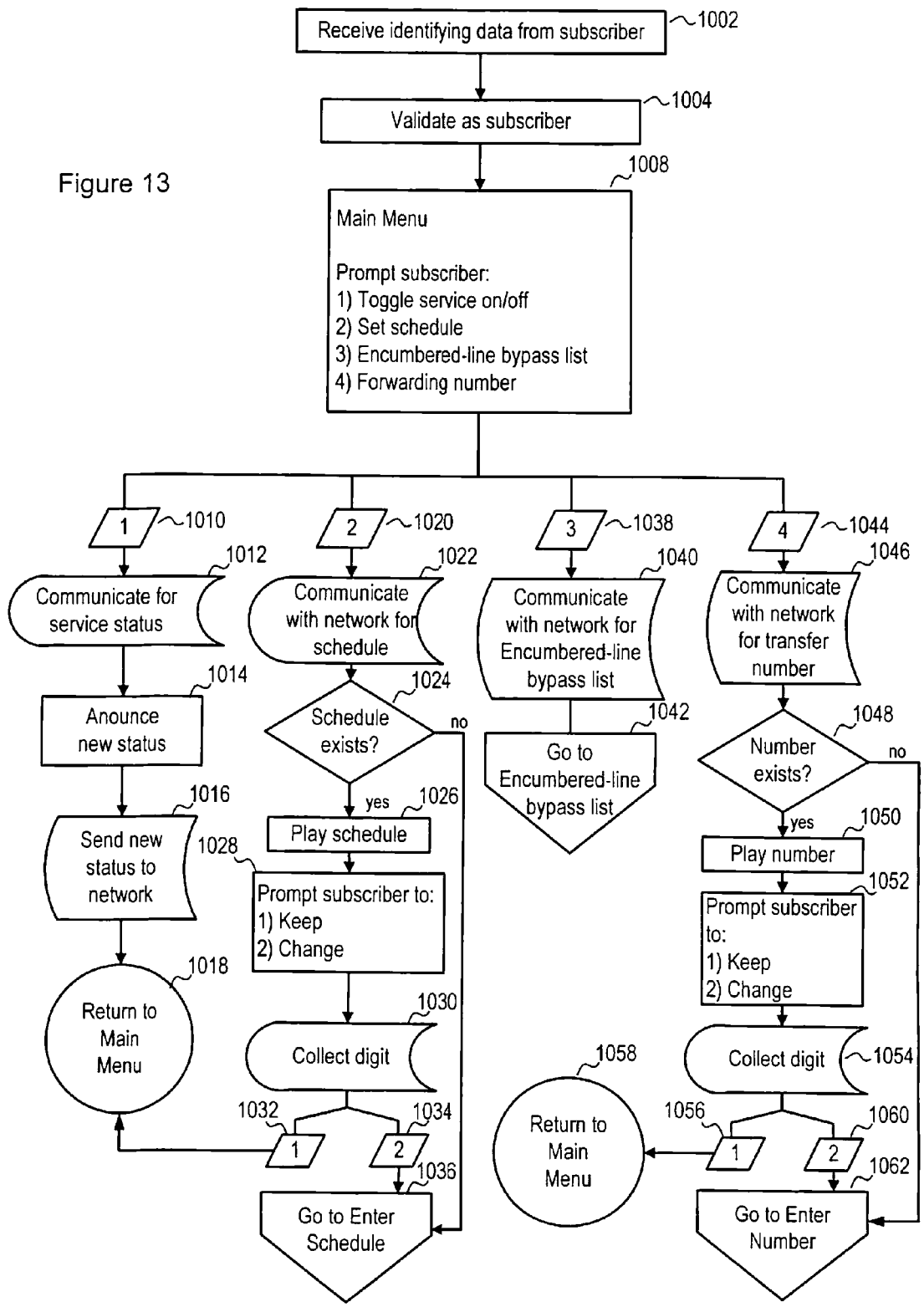
FIG. 13 is a flow diagram of a preferred embodiment of an IVR-based method in accordance with the present invention.
Figure 14:
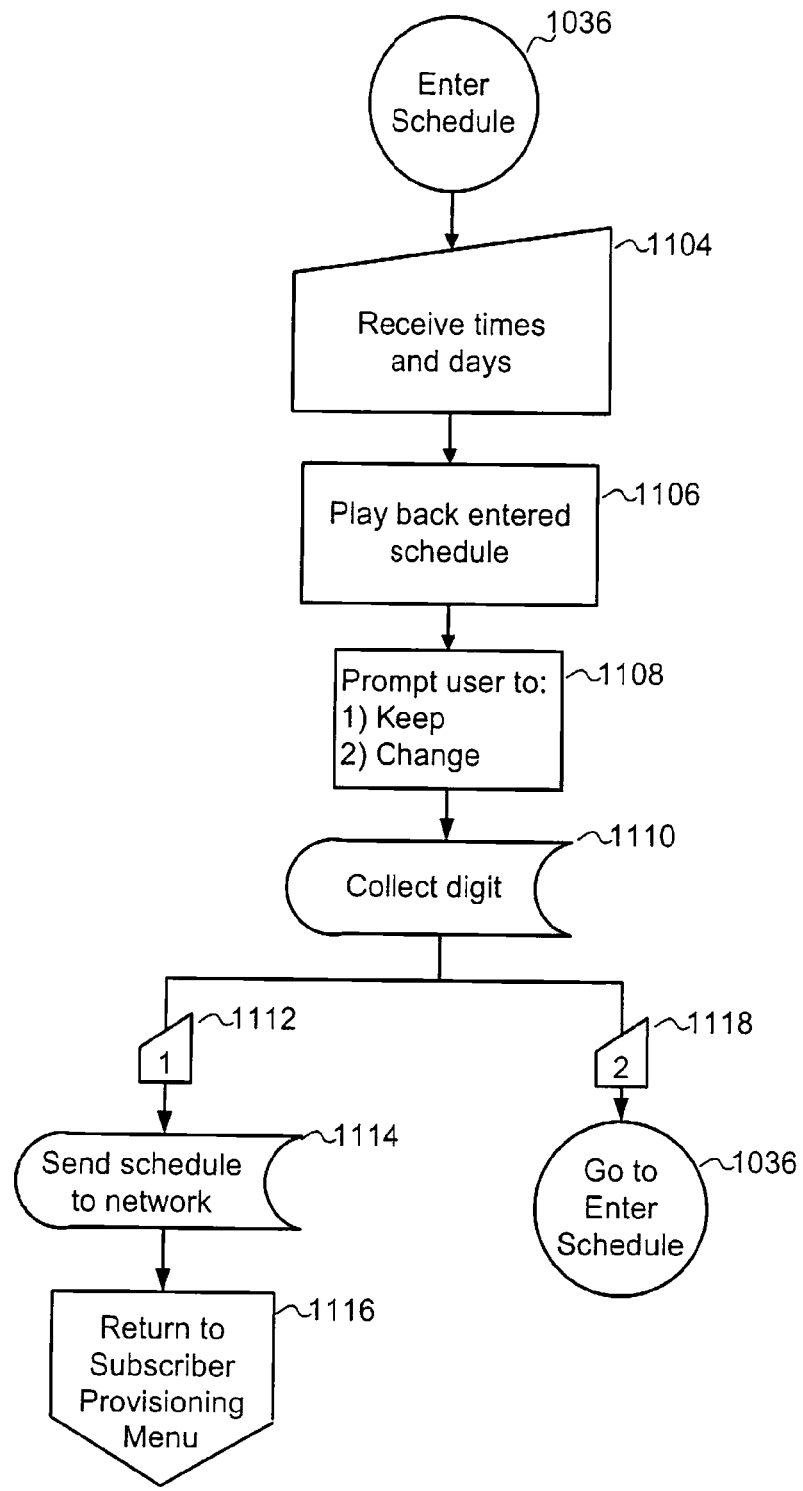
FIG. 14 is a flow diagram of a preferred embodiment of an enter schedule method for an IVR-based method in accordance with the present invention.

FIG. 14 shows a flow diagram of an embodiment of a method in accordance with the present invention. The method set forth in FIG. 14 represents a preferred embodiment of a method whereby an interactive voice response system asks for and receives a schedule. In step 1036, which is also shown in FIG. 13, the IVR system receives a schedule entered by the subscriber. The IVR system, according to step 1104, communicates with the subscriber, receiving, waiting and/or prompting the subscriber to enter start and stop times and days. With this information, the IVR system plays back the stop and start times and days and other information in step 1106. In step 1108, the IVR system prompts the subscriber to keep or change or otherwise edit the start and stop times and days and other information played back according to step 1106. In step 1110 the IVR system collects digits, for example a one-digit for keep and a two-digit for change.

If the IVR system receives a one-digit from the subscriber, step 1112, the IVR system communicates the schedule received by the IVR system in step 1104 to the communications network, step 1114. Preferably, the IVR system communicates the schedule to one or more communications network elements, such as an intelligent peripheral. In an exemplary embodiment, the IVR system communicates the schedule to an SCP. After performing this step, the IVR system returns the subscriber to the provisioning menu, step 1116 (back to step 1008).

If, in step 1110 the IVR system collects a two-digit 1118, the IVR system proceeds to enter schedule step 1036, and the process begins again.

Figure 15:
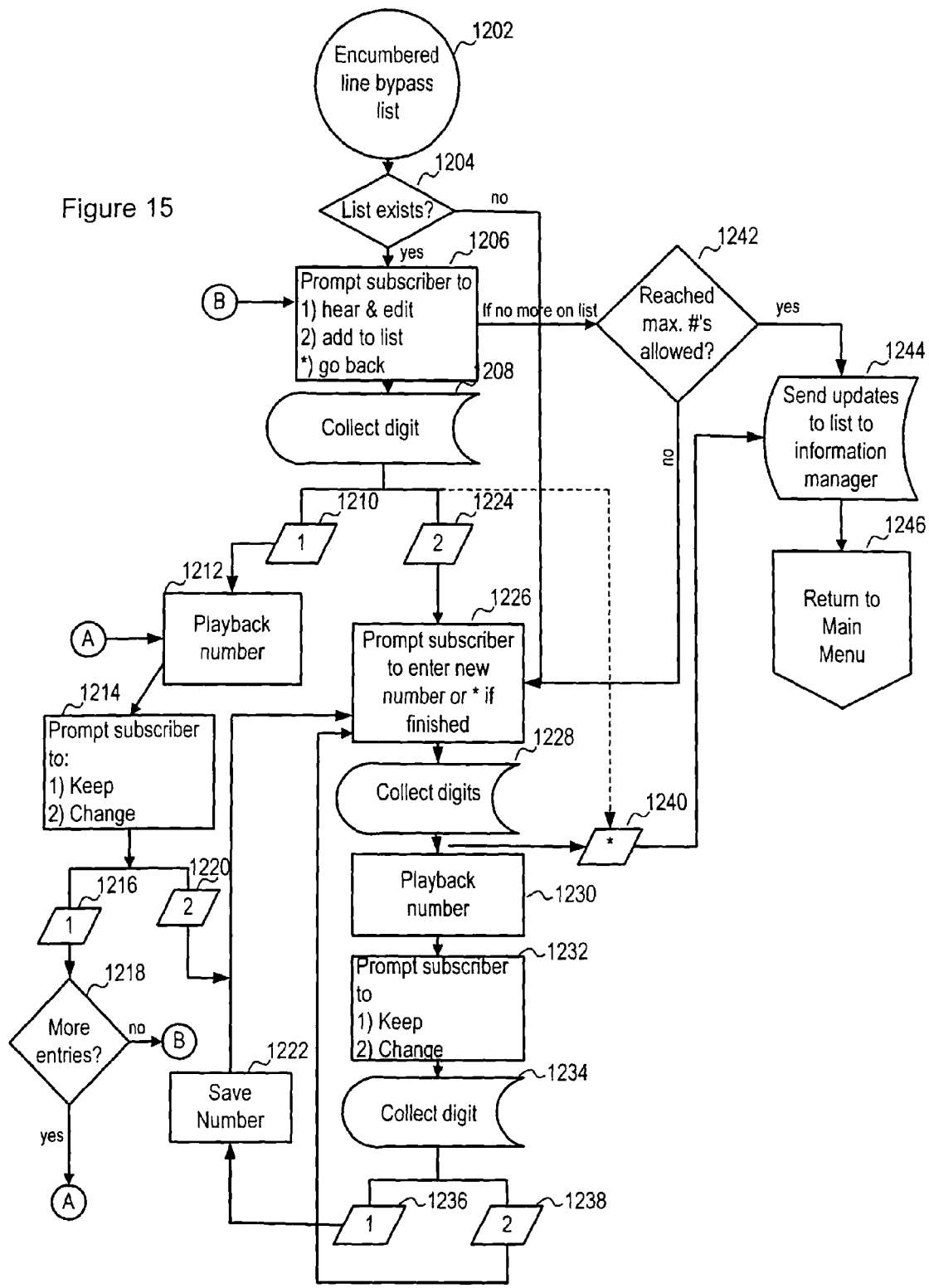
FIG. 15 is a flow diagram of a preferred embodiment of an encumbered-line bypass list method for an IVR-based method in accordance with the present invention.

FIG. 15 is a flow diagram of a preferred embodiment of a method in accordance with the present invention. The method shown in FIG. 15 is, in part, a process whereby an IVR system interacts with a subscriber and a communications network. Preferably this method can be used to facilitate receipt, by the communications network from the subscriber, of information related to additions, deletions, or adjustments on that subscriber's encumbered-line bypass list.

After performing step 1042 of FIG. 13, the IVR system proceeds with step 1202 of FIG. 15. In step 1204 the IVR system determines whether or not an encumbered-line bypass list exists. If the encumbered-line bypass list does not exist, the IVR system proceeds according to step 1226, prompting the subscriber to enter a new number or a star-digit if the subscriber is finished. If the encumbered-line bypass list does exist, step 1204, the IVR system proceeds to step 1206 where the system prompts the subscriber to choose by input of a digit, to hear and edit numbers currently contained within the subscriber's encumbered-line bypass list, to add numbers to the subscriber's encumbered-line bypass list, or to go back.

In step 1206, if the IVR system receives, for example, a one-digit, the IVR system collects that digit according to step 1208, proceeds to step 1210, and then to step 1212 where it plays back the telephone numbers in the encumbered-line bypass list. As part of step 1212, the IVR system preferably guides the subscriber by presenting each of the telephone numbers or pass-codes within the encumbered-line bypass list to the subscriber in order. The IVR system can also include particular details. These particular details could, for example, include information such as the name of the person associated with the telephone number. The name of the person could be associated with the number by public record, by receipt from the person having such number, by receipt from the subscriber, by having been previously received from the subscriber and stored in information manager 610 or database 502, or by some other means.

In step 1214 the IVR system prompts the subscriber to keep or change a particular telephone number or pass-code in the encumbered-line bypass list. Preferably the IVR system also prompts the subscriber to edit the telephone numbers and pass-codes and associated details that are on the subscriber's encumbered-line bypass list.

If the IVR system receives, for example, a one-digit from the subscriber according to step 1216, the IVR system proceeds to step 1218. If there are more entries received from the subscriber, step 1218, the IVR system returns to step 1212, playing back telephone numbers and pass-codes in the encumbered-line bypass list and again proceeding through steps 1212, 1214 and so on. If there are no more entries received from the subscriber, step 1218, the IVR system returns to step 1206.

If, after prompting the subscriber according to step 1214, the IVR system receives a two-digit from the subscriber according to step 1220, the IVR system proceeds to step 1226. Step 1226 will be discussed below.

With the above steps proceeding from step 1206 described, the following sets forth another set of steps potentially proceeding from step 1206. As set forth above, the IVR system prompts the subscriber according to step 1206. If the IVR system receives a two-digit, for example, rather than a one-digit as set forth above, the IVR system collects that digit according to step 1208 and proceeds to step 1224 and then to step 1226. In step 1226 the IVR system prompts the subscriber to enter new telephone numbers and pass-codes to add to the subscriber's encumbered-line bypass list, and preferably associated details for those numbers, or to enter a star-digit if the subscriber is finished.

From step 1226, the IVR system collects digits from the subscriber according to step 1228. If the IVR system collects a telephone number or pass-code, the IVR system plays such number back to the subscriber, step 1230. After playing back the number according to step 1230 the IVR system prompts the subscriber to either keep or change the telephone number or pass-code that the subscriber just entered, step 1232.

In step 1234 the IVR system collects, for example, either a one-digit or a two-digit from the subscriber. In cases where the IVR system collects the one-digit, step 1236, it then saves the telephone number or pass-code that the subscriber previously entered, step 1222. Preferably it saves the telephone number or pass-code by storing it with the encumbered-line bypass list in a database accessible by a communications network. Also preferably, the IVR system updates the encumbered-line bypass list when it receives changes to the telephone numbers and pass-codes. In cases where the IVR system collects the two-digit, step 1238, the IVR system proceeds to step 1226.

Preferably, the IVR system then allows the subscriber to continue to input numbers until the telephone numbers and pass-codes are correct and continue to be able to keep correcting them or allowing the subscriber to continue entering additional telephone numbers and pass-codes into the encumbered-line bypass list until the subscriber is satisfied, either by the process described in FIG. 15 or some other similar process.

If, after prompting the subscriber according to step 1226, the IVR system receives an asterisk from the subscriber, step 1228, the IVR system proceeds to step 1240, then proceeds to step 1244. In step 1244, the IVR system sends updates to the telephone numbers and pass-codes, associated details, or other information to the information manager. Preferably the IVR system also sends the update to an intelligent peripheral of the communications network. In an exemplary embodiment, the IVR system sends an update list to an SCP of the communications network. After so doing, the IVR system returns to the main menu, step 1246.

In step 1228 the IVR system collects whatever digits have been entered by the subscriber. If the subscriber has entered an asterisk, step 1240, the IVR system proceeds to step 1244. If the IVR system has proceeded to step 1244 it sends an update list to the information manager. After setting an update according to step 1244, the IVR system then returns the subscriber to the main menu in step 1246.

Returning to step 1206. In cases where the IVR system has been requested to play back the telephone numbers and pass-codes on the subscriber encumbered-line bypass list and every number in the subscriber encumbered-line bypass list has been played back to the subscriber, the IVR system proceeds to step 1242.

In step 1242 the IVR system, if it does not reach the maximum number of telephone numbers and pass-codes in an encumbered-line bypass list, returns to step 1226. In cases where the maximum number of telephone numbers and pass-codes that is allowed in the encumbered-line bypass list has been reached, the IVR system, according to step 1242 proceeds to step 1244. The system then updates the communications network according to step 1244 and returns the subscriber to the main menu, step 1246.

With the above steps proceeding from step 1206 described, there is another set of steps potentially proceeding from step 1206. As set forth above, the IVR system prompts the subscriber according to step 1206. If the IVR system receives an asterisk, step 1208, the IVR system proceeds along the dash-line from after step 1208 to step 1240. The IVR system then proceeds according to step 1244 as described above.

Figure 16:
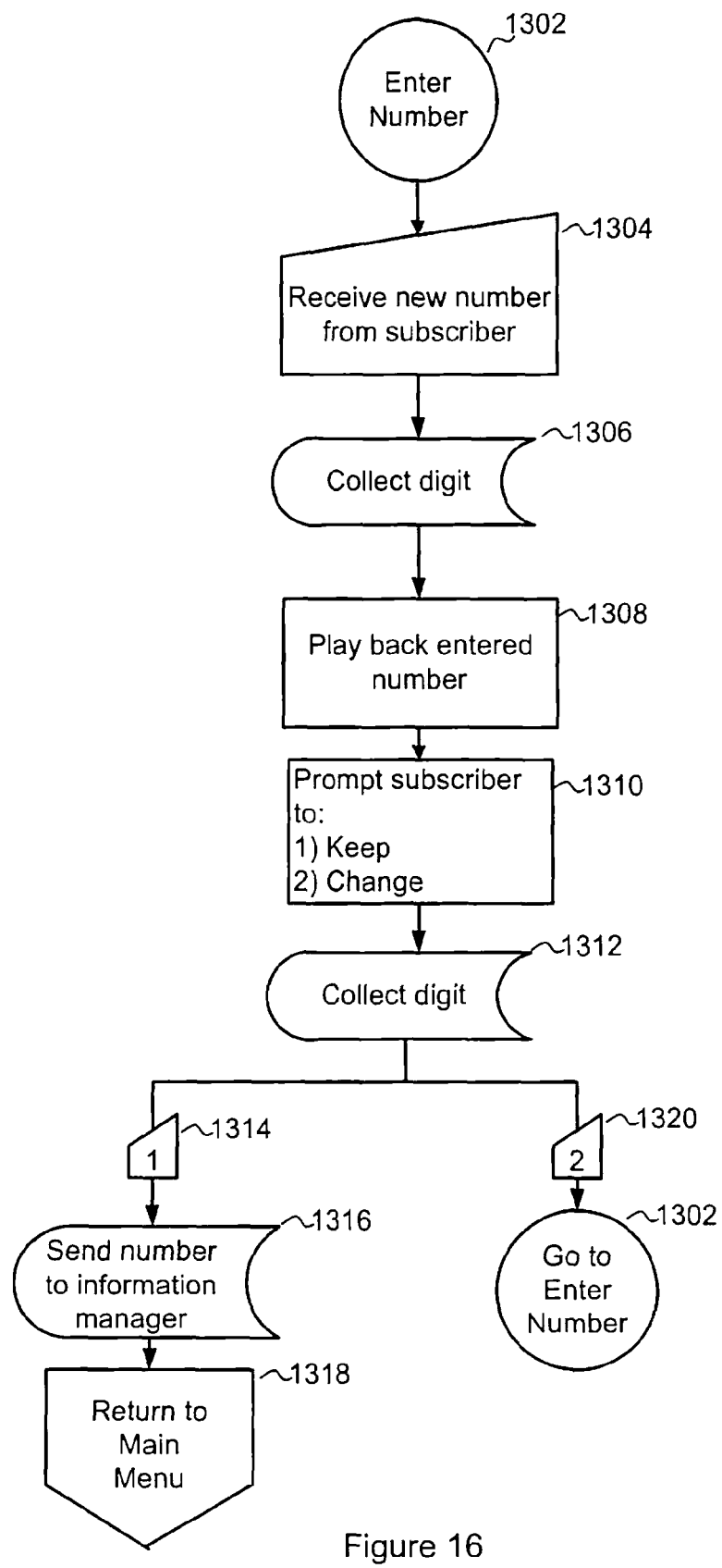
FIG. 16 is a flow diagram of a preferred embodiment of an enter number method for an IVR-based method in accordance with the present invention.

FIG. 16 shows a flow diagram of a preferred embodiment of a method in accordance with the present invention. The method set forth in FIG. 16 is a preferred embodiment of a method whereby an interactive voice response system receives a new or modified forwarding number. In step 1302 the IVR system prompts the subscriber to enter a new or modified forwarding number. In step 1304 the IVR system receives one or more numbers input from the subscriber. Once this IVR system has received these numbers the IVR systems collects the numbers, preferably digit-by-digit, according to step 1306. The IVR system then plays back the numbers entered by the subscriber according to step 1308 to confirm correct entry.

In step 1310 the IVR system prompts the subscriber to keep (in this example a one-digit) or change (in this example a two-digit) the information that was communicated back to the subscriber in step 1308. In step 1312 the IVR system collects a one-digit or a two-digit, per this example. If the IVR system receives a one-digit, step 1314, the IVR system communicates the number to the information manager, step 1316. Preferably, the IVR system communicates the number to an intelligent peripheral of the communications network. In an exemplary embodiment, the IVR system communicates the number to an SCP of the communications network. After sending the number to the information manager the IVR system returns the subscriber to the main menu in step 1318.

If the IVR system receives a two-digit from the subscriber, however, step 1320, the IVR system proceeds to step 1302, and returns the subscriber to the beginning.

Figure 17:
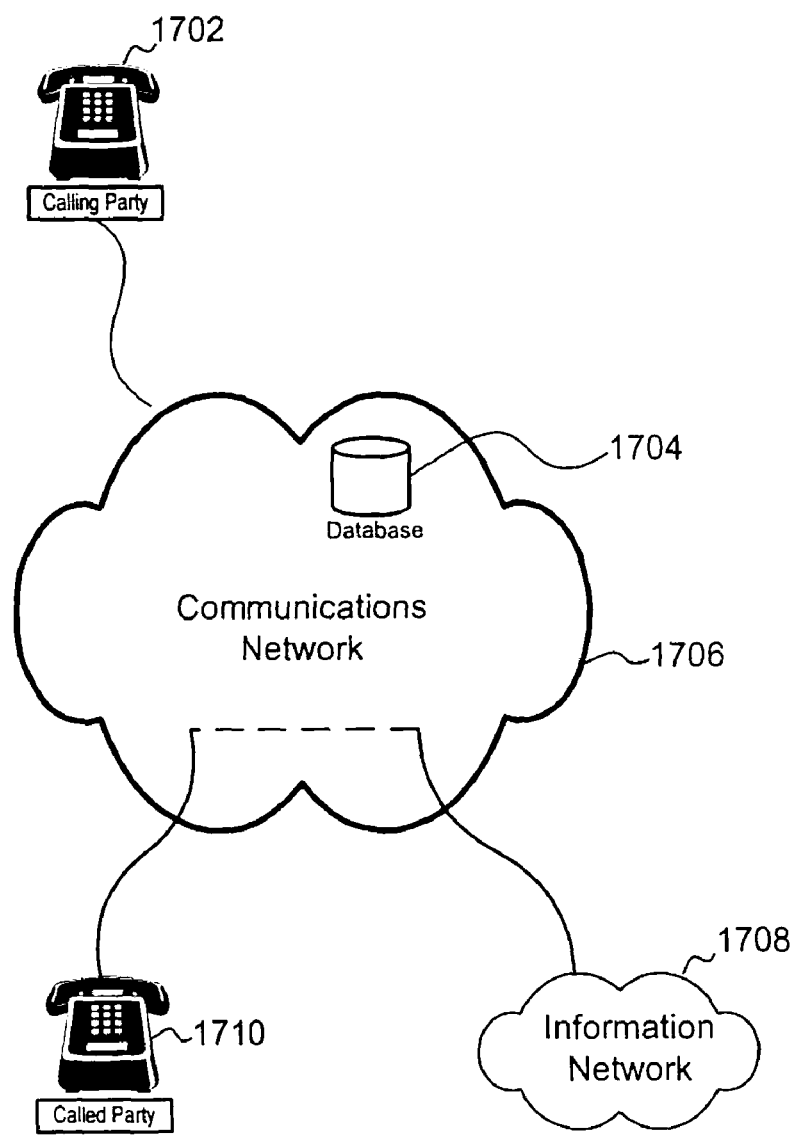
FIG. 17 is a schematic diagram of a preferred embodiment of a system usable with a service in accordance with the present invention.

FIG. 17 is a schematic diagram, portions of which show a preferred embodiment of the present invention. FIG. 17 sets forth a calling party 1702, a database 1704, a communications network 1706, an information network 1708, and a called party 1710. Communications network 1706 is configured to communicate with calling party 1702, database 1704, information network 1708, and called party 1710. Database 1704 is shown "inside" communications network 1706, but may, in some embodiments, be "outside" of communications network 1706. If "inside" communications network 1706, database 1704 may form a portion of communications network 1706. If "outside" communications network 1706, database 1704 may be another component in communication with communications network 1706. FIG. 17 sets forth these elements as a preferred embodiment of the present invention, and also as an aid to explain the functions of communications network 1706.

Figure 18:
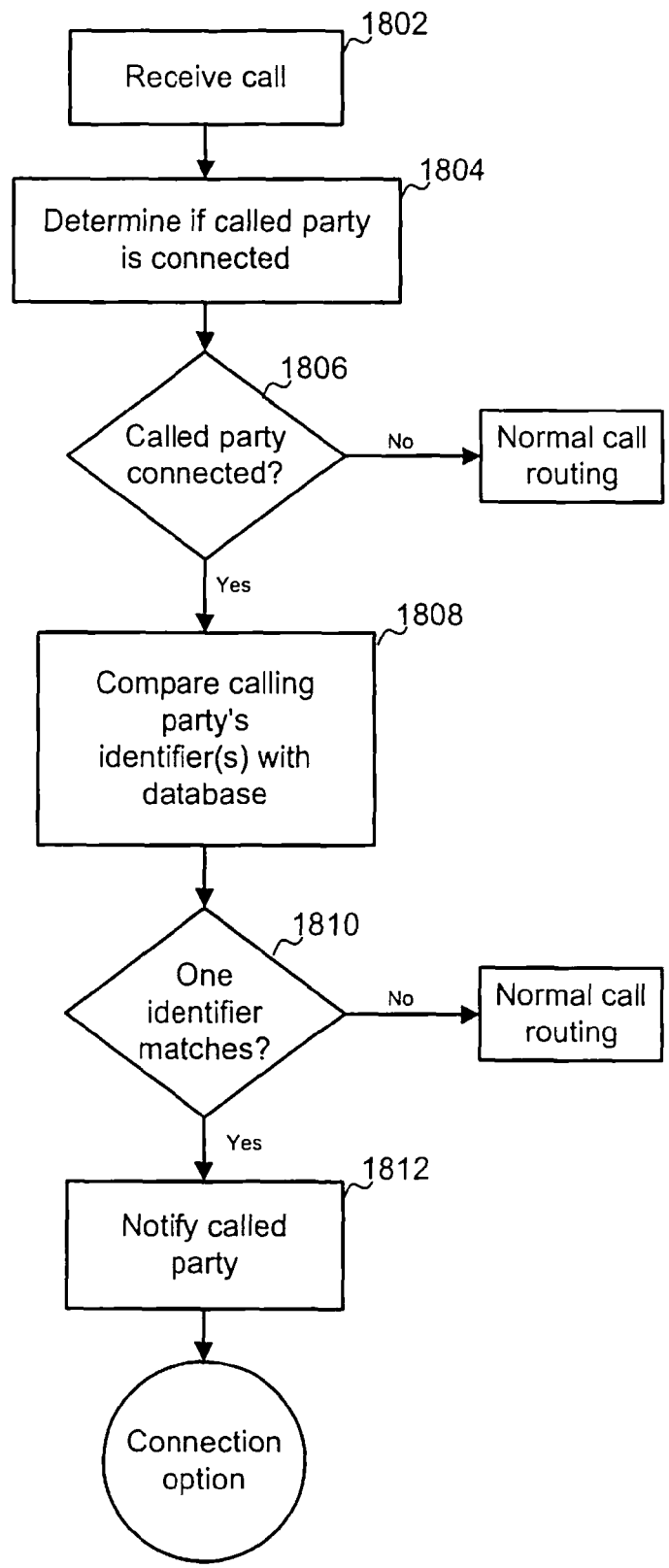
FIG. 18 is a flow diagram of a preferred embodiment of a method in accordance with the present invention.

FIG. 18 is a flow diagram of a preferred embodiment of a method in accordance with the present invention. This preferred embodiment sets forth, in part, a method showing how a communications network may selectively notify and/or connect a calling party to a called party that is connected to an information network, based upon the called party's preferences. For clarity, the below description of the preferred embodiment refers to elements set forth in FIGS. 17 and 21-23, keeping in mind that many other different types and/or forms of elements can also be used to practice the disclosed methods.

In step 1802, communications network 1706 receives a call from calling party 1702. Communications network 1706 may do so as set forth in the embodiments described above.

In step 1804, communications network 1706 determines whether called party 1710 is or is not connected to information network 1708. Information network 1708 may be a global Internet, an extranet, and intranet, or any other information network. Communications network 1706 preferably determines whether or not called party 1710 is connected to information network 1708 by comparing the telephone number that called party 1710 is connected to with a list of telephone numbers stored in database 1704 that are used by information network 1708. In an exemplary embodiment, communications network 1706 makes this determination by comparing the telephone number that called party 1710 is connected to with a list of one or more telephone numbers stored in database 1704. In some cases, called party 1710 previously communicated these telephone numbers to communications network 1706. In other exemplary cases, communications network 1706 makes this determination through communicating with information network 1708 or a service provider of information network 1708.

If communications network 1706 determines that called party 1710 is not connected to information network 1708, according to step 1806, communications network 1706 does not proceed to step 1808.

If communications network 1706 determines that called party 1710 is connected to information network 1708, according to step 1806, communications network 1706 proceeds to step 1808.

In step 1808, communications network 1706 compares calling party 1702's identifiers with information in database 1704. Communications network 1706 may do so as set forth in the embodiments described above with reference to FIGS. 6, 7, 8, and 9.

If communications network 1706 determines that no identifiers of calling party 1702 correspond to information in database 1704, according to step 1810, communications network 1706 does not proceed to step 1812.

If communications network 1706 determines that one or more identifiers of calling party 1702 correspond to information in database 1704, according to step 1810, communications network 1706 proceeds to step 1812.

In step 1812, communications network 1706 notifies called party 1710. Preferably, communications network 1706 notifies called party 1710 that calling party 1702 has called party 1710.

In an exemplary embodiment, a communications network 2106 (set forth in FIG. 21) notifies a called party 2110 of a first calling party 2102's call through a pop-up window 2126. Pop-up window 2126 pops up on a screen 2124 of a called party's computer 2120. Communications network 2106 preferably generates pop-up window 2126 by communicating with the service provider of called party 2110's information network, such as an information network 2108.

Figure 19:
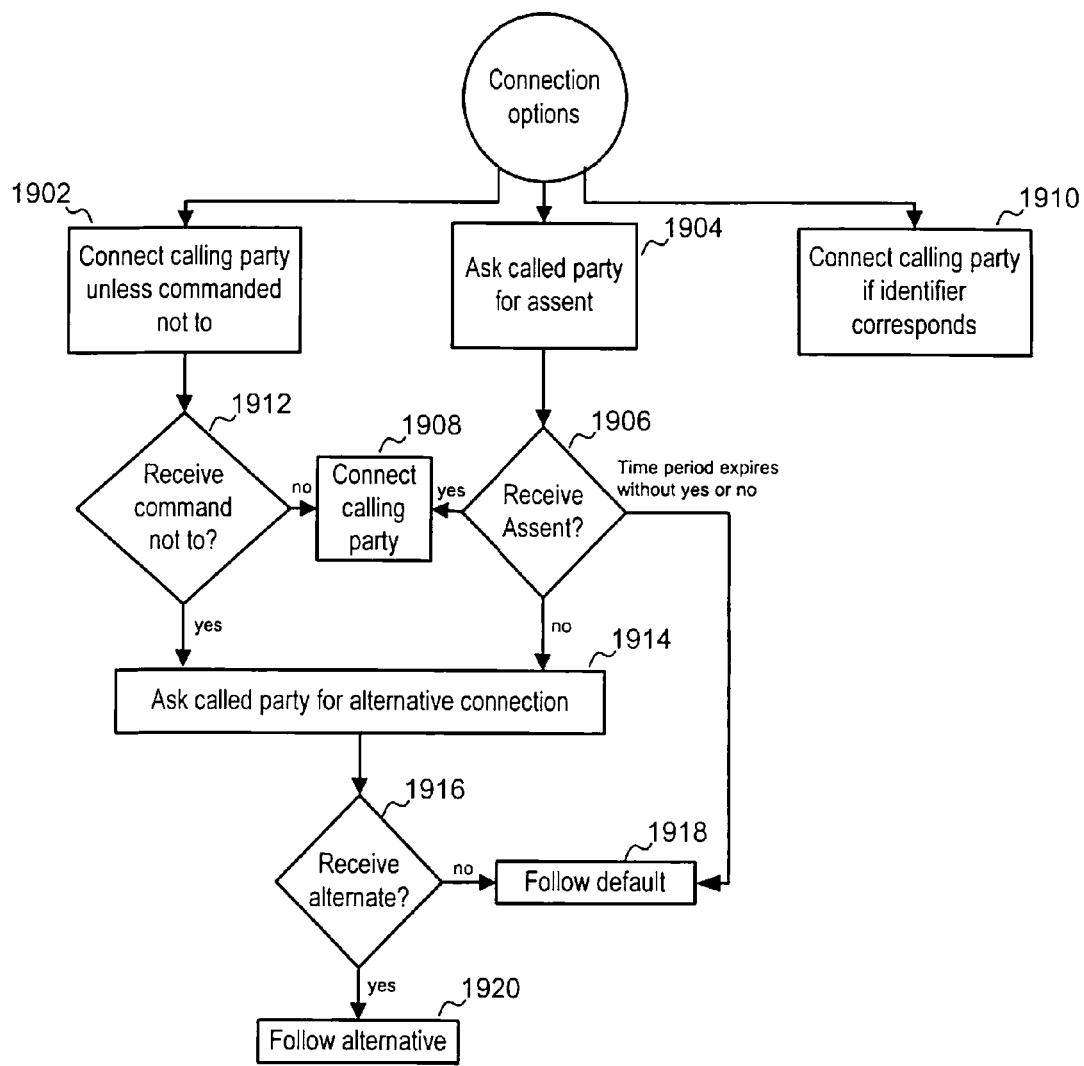
FIG. 19 is a flow diagram of a preferred embodiment of a connection options method in accordance with the present invention.

After step 1812, communications network 1706 preferably proceeds to one of three connection options, set forth in FIG. 19.

FIG. 19 is a flow diagram of three preferred embodiments of a method in accordance with the present invention. These preferred embodiments set forth, in part, methods showing how the communications network may selectively connect a calling party to a third party or a called party that is connected to an information network or disconnect the call of the calling party, each based upon the called party's preferences. For clarity, the description below of the preferred embodiments refer to elements set forth in FIGS. 17 and 21-23.

In step 1910, communications network 1706 disconnects called party 1710 from information network 1708 and connects calling party 1702 to called party 1710. Communications network 1706 does so if certain identifier(s) of calling party 1702 correspond to certain information in database 1704.

In an exemplary embodiment of step 1910, a communications network 2106 (set forth in FIG. 21) disconnects a called party 2110 (which is on a called party's computer 2110) from an information network 2108 if certain identifier(s) of first calling party 2102 correspond to certain information in a database 2104. In this exemplary embodiment communications network 2106 receives two identifiers as part of the transmission of first calling party 2102's call. The first identifier of calling party 2102 is calling party 2102's telephone number, 404-555-4444. The second identifier of calling party 2102 is the time that communications network 2106 received calling party 2102's call, in this example 8:13 p.m.

In this exemplary embodiment, with these two identifiers, communications network 2106 disconnects called party 2110 from information network 2108 and connect calling party 2102 to called party 2110. Communications network 2106 does so because, as is shown in an information network bypass list 2122 (Bypass List 2122), which is stored as information in a database 2104, calling party 2102's identifier of 404-555-4444 corresponds to a telephone number in Bypass List 2122 that has disconnect times, and also because calling party 2102's identifier of a call time of 8:13 p.m. corresponds to the disconnect times by being between 6 p.m. and 6 a.m.

Preferably, the communications network is capable of allowing a called party to set his or her preferences such that calls that will be disconnected may be done so either automatically or at the option of the called party.

The following exemplary embodiment shows how communications network 1706 can notify called party 1710, as part of step 1812 or step 1910, that communications network 1706 will disconnect called party 1710 from information network 1708. In this exemplary embodiment, communications network 1706 notifies called party 1710 through a pop-up screen 2208 (set forth in FIG. 22). As set forth in FIG. 22, pop-up screen 2208 pops up from screen 2202 of called party's computer 2210. In the example shown in pop-up screen 2208, which is intended to be purely exemplary of the invention, pop-up screen 2208 notifies called party 1710 of the name of calling party 1702 ("Mom's cell phone"), that calling party 1702 will be connected to called party 1710's telephone ("Mom's cell phone will be connected"), and how long before the call will be connected ("in 15 seconds").

In step 1902, communications network 1706 disconnects called party 1710 from information network 1708 and connects calling party 1702 to called party 1710 unless communications network 1706 receives a command from called party 1710 to not connect calling party 1702.

If communications network 1706 does not receive a command from called party 1710, according to step 1912, communications network 1706 proceeds to step 1908. In step 1908, communications network 1706 connects calling party 1702 to called party 1710 after disconnecting called party 1710 from information network 1708 (if necessary).

If communications network 1706 receives a command from called party 1710, communications network 1706 proceeds to step 1914. Communications network 1706 then follows steps 1914, 1916, and step 1918 or 1920 as set forth below.

The following exemplary embodiment shows how communications network 1706 can notify called party 1710, either as part of step 1812, step 1902, or otherwise, that communications network 1706 will connect calling party 1702 to called party 1710 (and, if necessary, disconnect called party 1710 from information network 1708), through a pop-up screen 2204 (set forth in FIG. 22) unless communications network 1706 receives a command from called party 1710 to not connect calling party 1710. As set forth in FIG. 22, pop-up screen 2204 pops up from screen 2202 of called party's computer 2210.

In the embodiment shown in pop-up screen 2204, which is intended to be purely exemplary of the invention, pop-up screen 2204 notifies called party 1710 of the name of calling party 1702 ("Dad at office"), that calling party 1702 will be connected to called party 1710's telephone ("will connect"), and how long before the call will be connected ("in 30 seconds") if called party 1710 does not enter the command to not connect (by clicking on the "Don't Connect" button).

In step 1904, communications network 1706 asks (by notification) called party 1710 whether or not to connect calling party 1702 to called party 1710.

Figure 22:
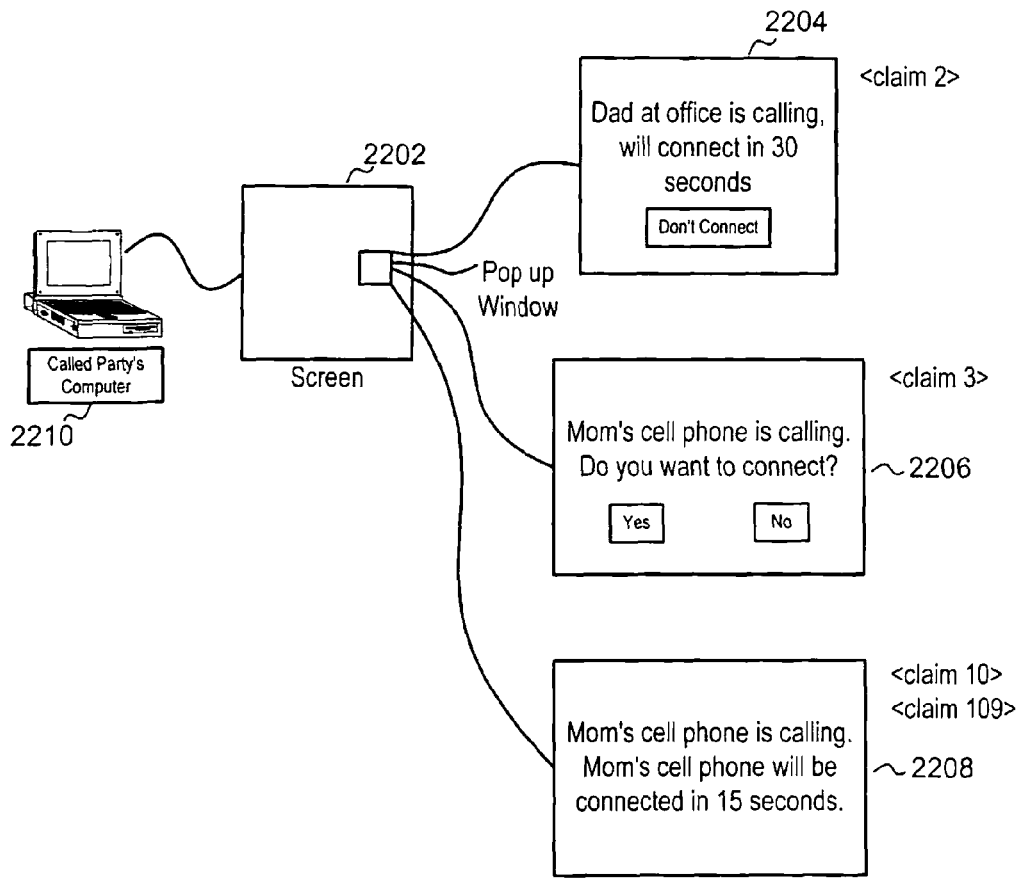
FIG. 22 is a schematic diagram of a preferred embodiment of three pop-up windows in accordance with the present invention.

In an exemplary embodiment, communications network 1706 notifies, as part of step 1812 or step 1904, called party 1710 that communications network 1706 is waiting for a reply from called party 1710, through a pop-up screen 2206 (set forth in FIG. 22). As set forth in FIG. 22, pop-up screen 2206 pops up from screen 2202 of called party's computer 2210.

In the embodiment shown in pop-up screen 2206, which is intended to be purely exemplary of the invention, pop-up screen 2206 notifies called party 1710 of the name of calling party 1702 ("Mom's cell phone"), asks for a command to connect calling party 1702 ("Do you want to connect?") through two buttons ("Yes" and "No").

In step 1906, communications network 1706 waits for some period of time for a command from called party 1710. If communications network 1706 does not receive a command, communications network 1706 proceeds to step 1918. In step 1918, communications network 1706 handles the call from calling party 1702 according to a default disposition for the call. Called party 1710 may set such default for calls from particular calling parties, and/or for all calls according to the embodiments set forth herein.

In an exemplary embodiment, a communications network allows a called party to set his or her preferences, which can be default preferences, through an interface system as set forth in FIG. 23. With this embodiment of an interface system, the called party can enter multiple identifiers for a particular calling party. In Bypass List 2302, the called party is allowed to set the telephone number of a potential calling party, the name for the calling party, the times at which the called party will be notified of a call from the calling party, and days and time periods during which a call from the calling party will be handled in different manners, including terminating, connecting, and notifying of the call.

In step 1912, if communications network 1706 receives a command of "No." communications network 1706 proceeds to step 1914. In step 1914, communications network 1706 asks for another command from called party 1710 for a particular disposition for the call. In an exemplary embodiment, communications network 1706 may ask called party 1710 to enter a disposition for the call in conjunction with step 1902 or 1812.

In step 1916, if communications network 1706 receives a particular command, communications network 1706 proceeds to step 1920. Otherwise, communications network 1706 proceeds to step 1918. Communications network 1706 follows step 1918 as set forth above.

In step 1920, communications network 1706 follows the disposition for the call as commanded by called party 1710. Preferably, communications network 1706 asks for commands through pop-up windows, but may ask for input in many other manners familiar to those skilled in the art.

In step 1906, if communications network 1706 receives a command from called party 1710 to connect calling party 1702, communications network 1706 disconnects called party 1710 from information network 1708 (if necessary) and connects calling party 1702 to called party 1710 according to step 1908.

In the example shown in pop-up screen 2206 (an example of step 1904 or step 1812), which is intended to be purely exemplary of the invention, pop-up screen 2206 notifies called party 1710 of the name of calling party 1702 ("Mom's cell phone"), that calling party 1702 will be connected or not connected to called party 1710's telephone ("do you want to connect"), if called party 1710 enters the command to connect or not connect (by clicking on the "Yes" or "No" button). If called party 1710 does not enter a command within a certain period of time, "Mom's cell phone" will be dealt with by communications network 1706 based upon called party 1710's preferences given to communications network 1706 prior to receiving the call. Preferably these preferences are information stored in database 1704. In an exemplary embodiment, these preferences are Bypass List 2122 or information network bypass list 2302 (Bypass List 2302).

Communications network 1706 preferably generates pop-up windows 2204, 2206, and 2208 by communicating with the service provider of called party 1710's information network, such as an information network 1708.

Figure 20:
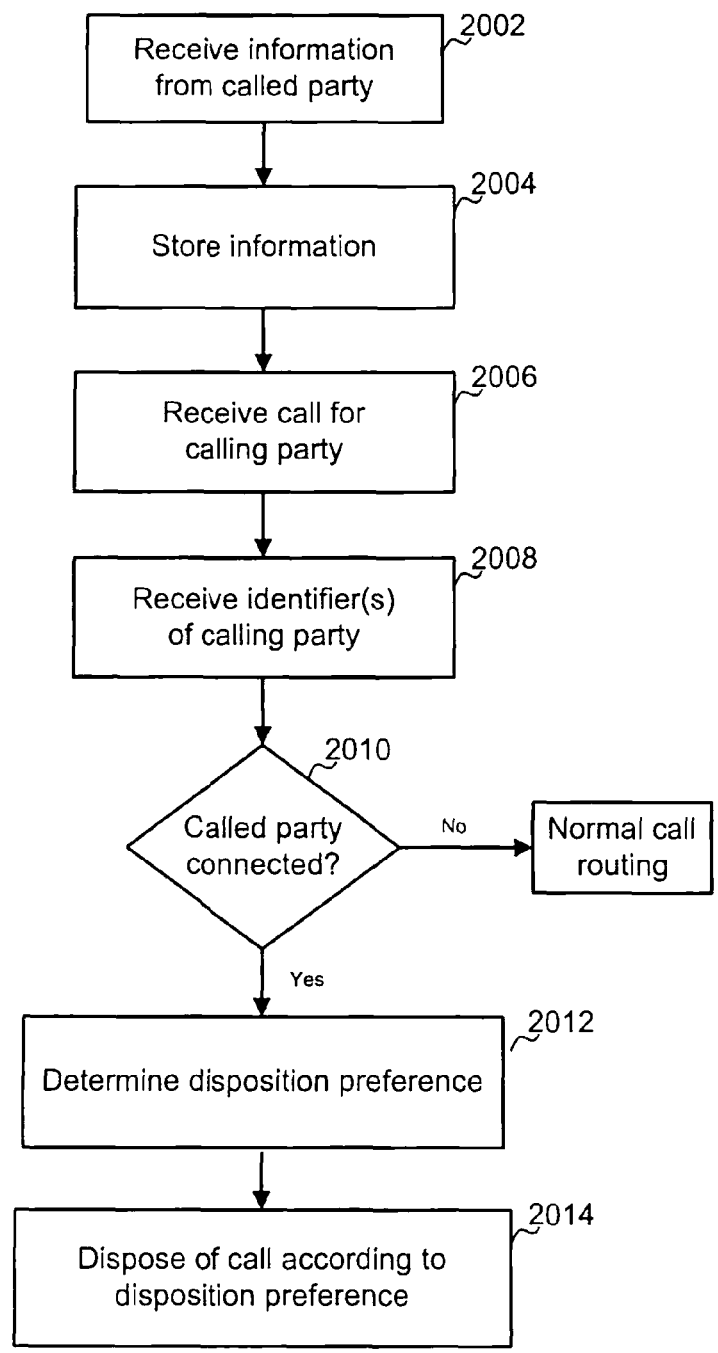
FIG. 20 is a flow diagram of a preferred embodiment of a method in accordance with the present invention.

FIG. 20 is a flow diagram of a preferred embodiment of a method in accordance with the present invention. This preferred embodiment sets forth, in part, a method showing how the communications network may selectively notify of and/or dispose of a calling party's call to a called party that is connected to an information network, based upon the called party's preferences. For clarity, the below description of the preferred embodiment refers to elements set forth in FIGS. 17 and 21-23.

In step 2002, communications network 1706 receives information from a called party 1710. Communications network 1706 may receive information as set forth in the embodiments above. Communications network 1706 may receive, by way of example only, information comprising Bypass List 2122 and Bypass List 2302, as set forth in FIG. 23.

In step 2004, communications network 1706 stores information received from called party 1710. Communications network 1706 may store information as set forth in the embodiments above. Communications network 1706 preferably stores the information into database 1704.

In step 2006, communications network 1706 receives a call from calling party 1702. Communications network 1706 may do so as set forth in the embodiments above.

In step 2008, communications network 1706 receives identifier(s) as part of a call of calling party 1702. Communications network 1706 may do so as set forth in the embodiments above.

In step 2010, communications network 1706 determines whether or not called party 1710 is connected to information network 1708. Communications network may do so as set for in the embodiments above. If communications network 1706 determines that called party 1710 is not connected to information network 1708, communications network 1706 does not proceed to step 2012. If communications network 1706 determines that called party 1710 is connected to information network 1708, communications network 1706 proceeds to step 2012.

In step 2012, communications network 1706 determines the disposition preference for the call from calling party 1702. Communications network 1706 determines the disposition preference for calling party 1702's call by comparing identifier(s) of calling party 1702 to information in database 1704. Communications network 1706 may compare identifier(s) of calling party 1702 to information in database 1704 according to the embodiments set forth above.

Preferably, communications network 1706 accesses from database 1704 detailed preferences of called party 1710, such as set forth in Bypass List 2122. In an exemplary embodiment, communications network 1706 accesses from database 1704 information on called party 1710's preferences for a particular calling party as set forth for that particular calling party ("Mom's cell phone") in Bypass List 2302.

In step 2014, communications network 1706 disposes of calling party 1702's call according to called party 1710's disposition preference. Preferably, communications network 1706 disposes of calling party 1702's call in a specific manner determined by certain identifiers of calling party 1702, such as the telephone number from which calling party 1702 called, the time calling party 1702 called, and/or pass-codes received by communications network 1706 from calling party 1702.

In an exemplary embodiment of step 2014, "Grandma" calls. As her telephone number (a second calling party 2112, telephone number "404-555-6666") is not in the information in database 1704, as set forth in Bypass List 2122, communications network 1706 will not notify called party 1710 or connect "Grandma" to called party 1710. If, however, "Grandma" enters her pass-code ("77777") after calling, communications network 1706 will, according to called party 1710's preferences shown in Bypass List 2122, notify called party 1710 regardless of when "Grandma" called. If "Grandma" enters her pass-code and is calling between 6 p.m. and 6 a.m., communications network 1706 will disconnect called party 1710 from information network 1708 (if necessary) and connect "Grandma" to called party 1710.

Communications network 2106 preferably connects calling party 2102 to a called party's telephone 2118. In some embodiments, communications network 2106 may connect calling party 2102 to a called party 2110 via called party's computer 2120. Preferably, communications network 1706 connects calling party 2102 to called party's computer 2120 if called party 2110 prefers to communicate with calling party 2102 over an information network 2108.

Communications network 1706 also allows called party 1710 to set his or her preferences for handling a particular call from a particular calling party in many ways as set forth in various embodiments above.

In an exemplary embodiment, shown in FIG. 23, called party 1710 may set his or her preference so that a particular caller ("Mom's cell phone" in Bypass List 2302) will connect to a line other than the line on which called party 1710 is currently connected to information network 1708. For instance, communications network 1706 may allow called party 1710 to set his or her preferences such that if "Mom's cell phone" calls at 6:04 a.m. (again for Bypass List 2302) on a particular day ("Weekday," "Weekend," or "Special") the call connects to a transfer number, such as a cell phone 2116, a second line 2114, an office number, a voicemail number, or certain custom numbers. Communications network 1706 may also allow called party 1710 to set his or her preferences so that "Mom's cell phone" is transferred to an intelligent peripheral, which can then terminate the call, preferably after an announcement message is played to "Mom's cell phone."

Also as part of step 2014, communications network 1706 may, in certain embodiments, notify called party 1710 as set forth above.

Figure 21:
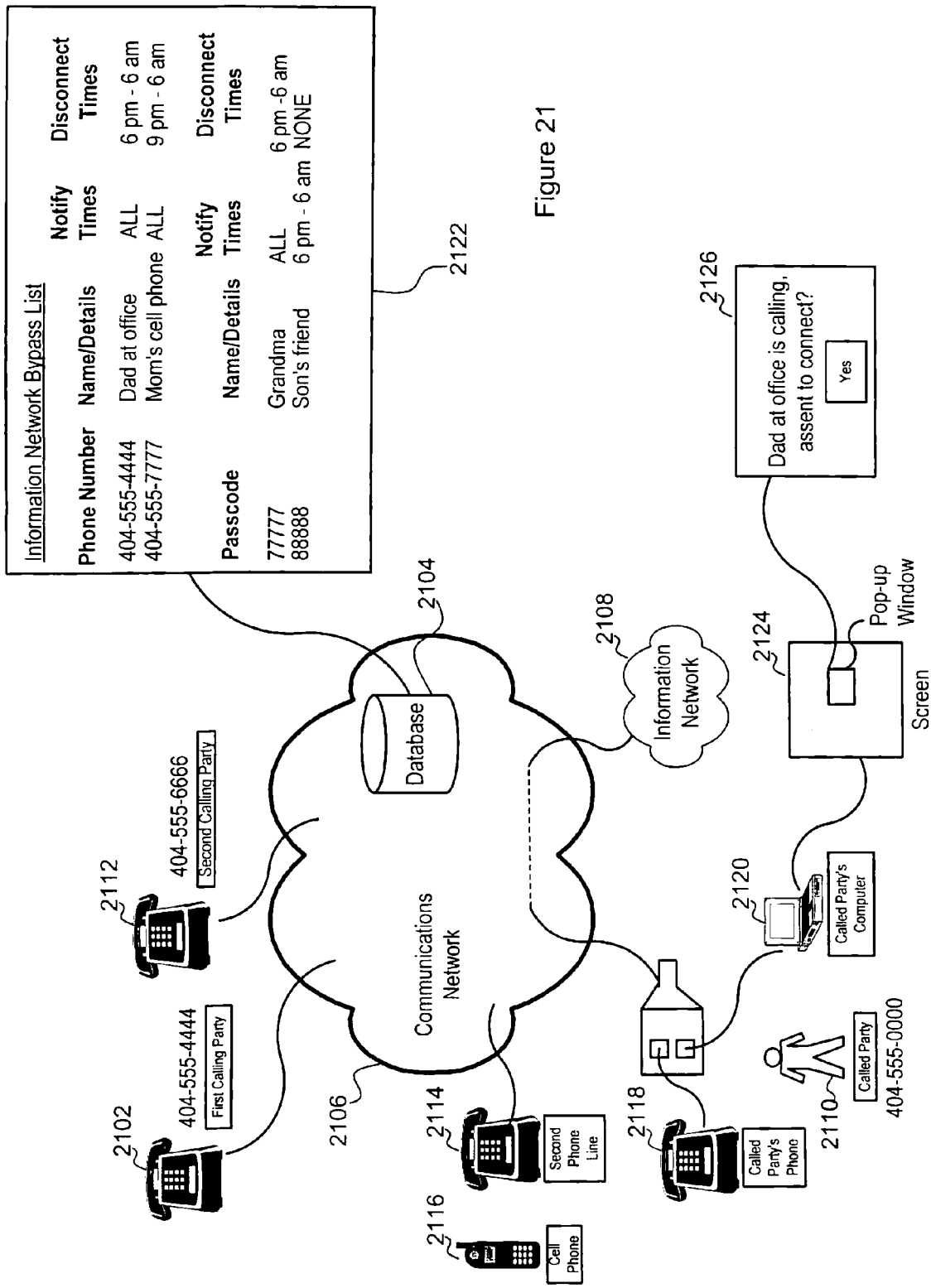
FIG. 21 is a schematic diagram of a preferred embodiment of a system and an information network bypass list in accordance with the present invention.

FIG. 21 is a schematic diagram, portions of which show a preferred embodiment of the present invention. FIG. 21 describes a system by which a communications network can handle calls from particular parties at particular times according to a called party's preferences when the called party is connected to an information network.

Communications network 2106 is configured to communicate with a database 2104, a first calling party 2102, a second calling party 2112, a second telephone line 2114, a cell phone 2116, a called party's telephone 2118, a called party 2110, an information network 2108, and called party's computer 2120. Communications network 2106 is also configured to communicate with called party 2110 via called party's computer 2120 visually or audibly. Communications network 2106 preferably is configured to communicate with called party 2110 through called party's computer screen 2124 with a pop-up window, 2126. Bypass List 2122 sets forth an example of some of the information that can be in database 2104.

FIG. 22 describes a system by which a communications network can notify and otherwise communicate with a called party via a screen on a called party's computer. FIG. 22 sets forth three examples of pop-up screens by which a communications network can communicate a called party via a called party's computer 2210 on its screen 2202. Three examples of pop-up windows include a pop-up window 2204, a pop-up window 2206, and a pop-up window 2208.

FIG. 23 is a schematic diagram, portions of which show a preferred embodiment of the present invention. FIG. 23 describes an example of one way the present invention allows a called party to select his or her disposition preference for a particular calling party. In this example, Bypass List 2302 sets forth a particular calling party, "Mom's cell phone"; when a communications network will notify the called party that the calling party is calling, "ALL"; the telephone number associated with the calling party, "505-555-7777"; and various days, "Weekdays," "Weekends," and "Special" that the time period (in this case, hourly) preferences for the calling party refer. Also, Bypass List 2302 sets forth an exemplary embodiment showing hourly preferences that determine how the communications network handles a call from the calling party based upon the time of day that the communications network receives the call.

In this exemplary embodiment, if the called party had clicked the box marked "Weekend," and the box marked "Cell," corresponding to a time period of 6 a.m. to 5 p.m., the communications network would, on Saturday or Sunday from 6 a.m. to 5 p.m., connect "Mom's cell phone" to a telephone number set by the called party corresponding to "Cell." Thus, once these preferences were set, a call from "Mom's cell phone" during these days and time period would be connected by the communications network to the called party's cell phone.

Also in this exemplary embodiment, if the called party clicked the box marked "Special," and the box marked "Custom Message #1," corresponding to a time period of 7 p.m. to 12 a.m., the communications network would, on days set by the called party (not shown), from 7 p.m. to 12 a.m., terminate "Mom's cell phone" after playing a custom message chosen by the called party (not shown).

Many other preferences can be chosen through the screen of the interface system shown in the exemplary embodiment in FIG. 23. Many combinations also can be chosen as is known in the art for setting preferences through an interface system. The examples set forth above are meant to be exemplary and not limiting.

Figure 24:
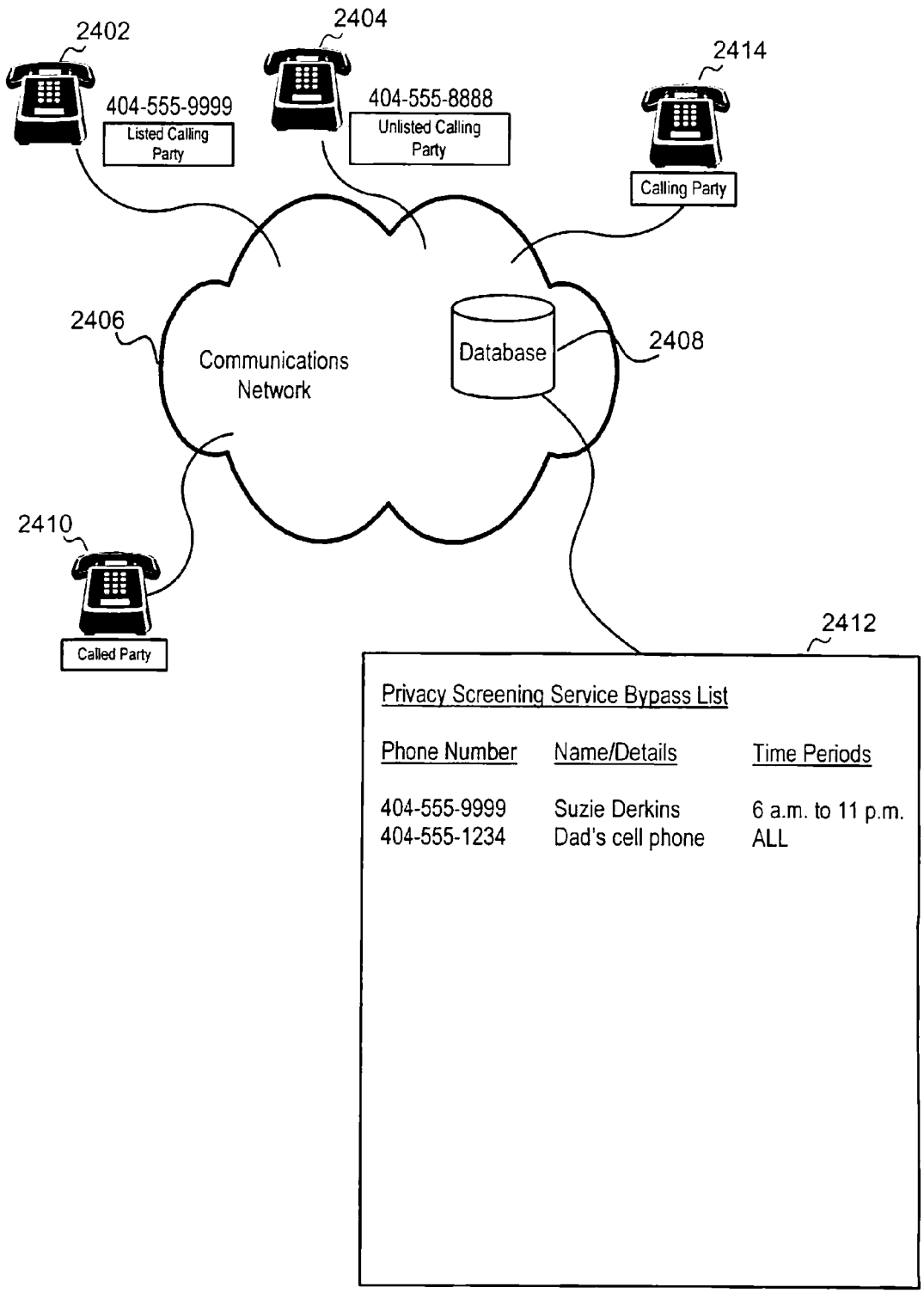
FIG. 24 is a schematic diagram of a preferred embodiment of a system usable with a service in accordance with the present invention.

FIG. 24 is a schematic diagram, portions of which show a preferred embodiment of the present invention. FIG. 24 sets forth a listed calling party 2402, an unlisted calling party 2404, a calling party 2414, a communications network 2406, a database 2408, a called party 2410, and a privacy screening service bypass list 2412.

Communications network 2406 is configured to communicate with called party 2410, database 2408, listed calling party 2402, unlisted calling party 2404, and calling party 2414. Preferably communications network 2406 is an intelligent network. In an exemplary embodiment, communications network 2406 is an AIN network. Communications network 2406 may be any other type of network capable of performing the methods set forth in FIGS. 25 and 26. Database 2408 is shown "inside" communications network 2406, but may, in some embodiments, be "outside" of communications network 2406. If "inside" communications network 2406, database 2408 may form a portion of communications network 2406. If "outside" communications network 2406, database 2408 may be another component in communication with communications network 2406. FIG. 24 sets forth these elements as a preferred embodiment of the present invention, and also as an aid to explain the functions of communications network 2406.

Figure 25:
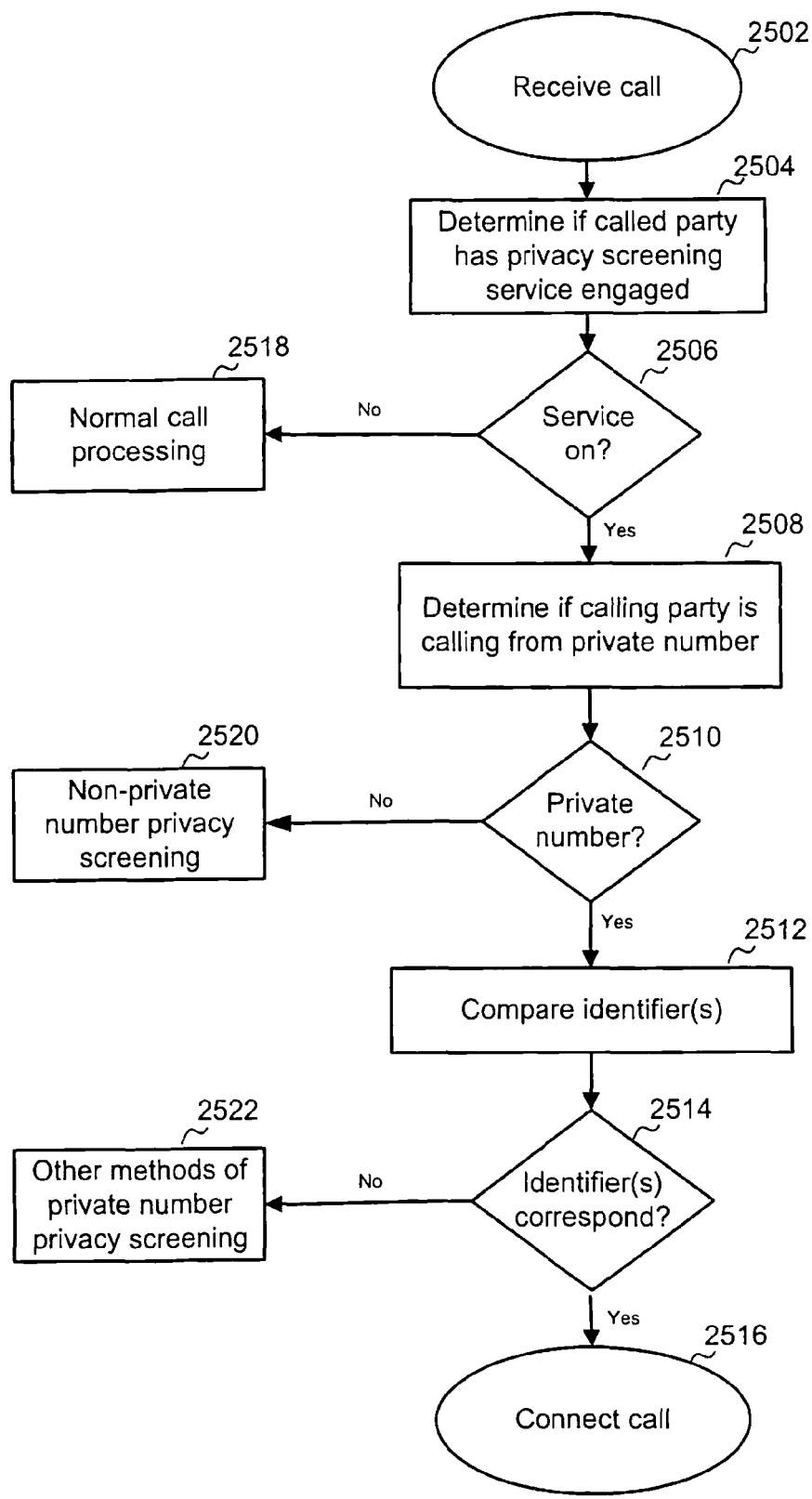
FIG. 25 is a flow diagram of a preferred embodiment of a method in accordance with the present invention.

FIG. 25 is a flow diagram of a preferred embodiment of a method in accordance with the present invention. This preferred embodiment sets forth, in part, a method showing how a communications network may selectively, based upon a called party's preferences, manage a call from a calling party calling from a private telephone number to the called party having a privacy screening service engaged. For clarity, the below description of the preferred embodiment refers to elements set forth in FIG. 24, keeping in mind that many other or different types and/or forms of elements can also be used to practice the disclosed methods. Example of other types and/or forms of elements include the embodiments described above and those set forth in "Privacy Screening Service With a Bypass Code," U.S. Pat. No. 6,647,106, now U.S. application Ser. No. 09/456,316, filed Dec. 8, 1999, "System and Method for Completing Private or Unknown Calls Made to Subscribers To a Privacy Screening Service," U.S. Pat. No. 6,553,109, now U.S. application Ser. No. 09/372,746, filed Aug. 10, 1999, and "System and Method for Privacy Management," U.S. Pat. No. 6,542,596, now U.S. application Ser. No. 09/372,676, filed Aug. 12, 1999, which are all incorporated herein by reference in their entirety.

In step 2502, communications network 2406 receives a call from calling party 2414. Communications network 2406 may receive calls as set forth in the embodiments described above.

In step 2504, communications network 2406 determines if called party 2410 has the privacy screening service engaged. Communications network 2406 can make this determination by communicating with a source of information that contains a status of the called party 2410 with regard to the privacy screening service. In a preferred embodiment, communications network 2406 makes this determination by communicating with one or more elements internal or external to communications network 2406, such as intelligent peripherals.

If communications network 2406 determines that called party 2410 either does not subscribe to the privacy screening service or otherwise does not have the privacy screening service engaged, communications network 2406 proceeds to step 2518, as shown by step 2506.

In step 2518, communications network 2406 proceeds to normal call processing. This normal call processing is the processing communications network 2406 normally completes when no privacy screening service is engaged.

If communications network 2406 determines that called party 2410 has the privacy screening service engaged in step 2506, communications network 2406 proceeds to step 2508.

In step 2508, communications network 2406 determines whether calling party 2414 is calling from a private number. Private (telephone) numbers include those that in any fashion block services such as "caller id," that do not allow services or features to identify a calling party that otherwise would, and/or that do not allow a privacy screening service to identify the phone number and/or the personal identity of the calling party. In an exemplary embodiment, a private number is one in which communications network 2406 can access the phone number from which calling party 2414 called but that communications network 2406, whether by law, preference of calling party 2414 or otherwise, does not normally inform called party 2410 of the phone number and/or identity of calling party 2414.

Communications network 2406 can determine whether calling party 2414 is calling from a private number in numerous manners known to one skilled in the art. In an exemplary embodiment, communications network 2406 determines whether calling party 2414 is calling from a private number by first determining whether calling party 2414, as part of the transmission of the call, includes information by which communications network 2406 may determine the number from which calling party 2414 called. Also in this embodiment, communications network 2406 can then communicate with a database, whether database 2408 or otherwise, that includes data by which communications network 2406 can determine the phone number from which calling party 2414 called as well as whether or not the phone number is private.

If calling party 2414's phone number is private, communications network 2406 proceeds to step 2512, according to step 2510. If calling party 2414's phone number is not private, communications network 2406 proceeds to step 2520, as shown in step 2510.

In step 2520, communications network 2406 proceeds to follow procedures for privacy screening set forth for phone numbers that are not private. In an exemplary embodiment, communications network 2406 proceeds to follow privacy screening procedures for phone numbers that are not private as set forth above, such as in "Privacy Screening Service With a Bypass Code," U.S. Pat. No. 6,647,106, now U.S. application Ser. No. 09/456,316, filed Dec. 8, 1999.

In step 2512, if it has been determined in step 2510 that the call is from a private number, communications network 2406 compares identifier(s) of calling party 2414 to information in database 2408. Communications network 2406 may do so as set forth in the embodiments described above. In an exemplary embodiment, communications network 2406 compares an identifier associated with calling party 2414's telephone number against the privacy screening service bypass list 2412's telephone numbers.

If communications network 2406 compares the identifier(s) of calling party 2414 and finds that the identifier(s) do not correspond to information in database 2408, communications network 2406 proceeds to step 2522, as shown by step 2514.

In step 2522, communications network 2406 proceeds to follow procedures for other method(s) of privacy screening for private number calls. In an exemplary embodiment, communications network 2406 proceeds to follow privacy screening procedures for private number calls as set forth above, such as in "System and Method for Completing Private or Unknown Calls Made to Subscribers To a Privacy Screening Service," U.S. Pat. No. 6,553,109, now U.S. application Ser. No. 09/372,746, filed Aug. 10, 1999.

In an exemplary embodiment, communications network 2406 receives a call from unlisted calling party 2404 having a private number of (404) 555-8888 (FIG. 24). Communications network proceeds through steps 2504, 2506, 2508, 2510 to step 2512. Communications network 2406 then compares unlisted calling party 2404's identifier of telephone number (404) 555-8888 to both phone numbers set forth in privacy screening service bypass list 2412. In this exemplary embodiment, communications network 2406 determines that this identifier of unlisted calling party 2404 does not correspond to a telephone number listed in privacy screening service bypass list 2412. In this embodiment, communications network 2406 proceeds through step 2514 then follows step 2522 as set forth above.

If communications network 2406 compares the identifier(s) of calling party 2414 and finds that one or more of the identifier(s) corresponds to information in database 2408, communications network 2406 proceeds to step 2516 according to step 2514.

In step 2516, communications network 2406 connects the call from calling party 2414 to called party 2410.

In an exemplary embodiment, communications network 2406 receives a call from listed calling party 2402 having a private number of (404) 555-9999 (FIG. 24). Communications network proceeds through steps 2504, 2506, 2508, 2510 to step 2512. Communications network 2406 then compares listed calling party 2402's identifier of telephone number (404) 555-9999 to both phone numbers set forth in privacy screening service bypass list 2412. In this exemplary embodiment, communications network 2406 determines that this identifier of listed calling party 2402 corresponds to a telephone number listed in privacy screening service bypass list 2412 of 404-555-9999 (Suzie Derkins). In this embodiment, communications network 2406 proceeds through steps 2514 and 2516 and connects listed calling party 2402's call to called party 2410.

In an exemplary embodiment of the invention, after step 2514 is completed with "Yes," communications network 2406 notifies called party 2410 of the name/details listed in privacy screening service bypass list 2412 (if allowed by law). In another exemplary embodiment, communications network 2406 notifies called party 2410 that listed calling party 2402 is calling by displaying "Suzie Derkins," preferably through an LCD display.

In another exemplary embodiment, after step 2514 is completed with "Yes," communications network 2406 notifies called party 2410 that a calling party whose telephone number identifier corresponds to a telephone number in privacy screening service bypass list 2412 is calling by displaying "RingThruList," preferably through an LCD display.

Figure 26:
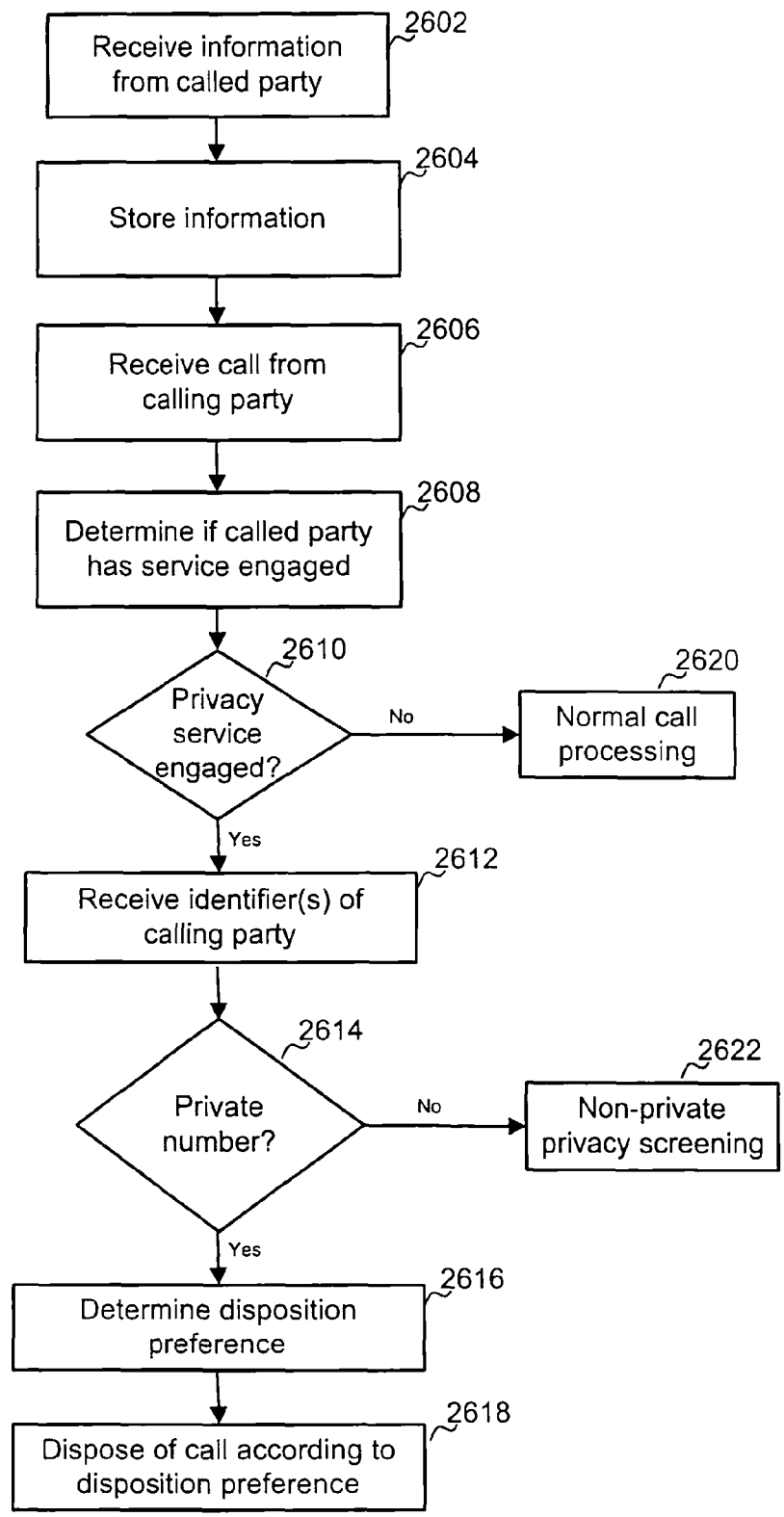
FIG. 26 is a flow diagram of a preferred embodiment of a method in accordance with the present invention.

FIG. 26 is a flow diagram of a preferred embodiment of a method in accordance with the present invention. This preferred embodiment sets forth, in part, a method showing how the communications network may selectively, based upon a called party's preferences, manage a call from a calling party calling from a private telephone number to the called party having a privacy screening service engaged. For clarity, the below description of the preferred embodiment refers to elements set forth in FIG. 24, keeping in mind that many other or different types and/or forms of elements can also be used to practice the disclosed methods. Example of other types and/or forms of elements are those set forth in the embodiments described above.

In step 2602, information is received from calling party 2414. An IVR, web interface, information network, communications network, or other system or entity capable of receiving information from an entity may receive information from calling party 2414. Other methods and systems of receiving information may be used, including those set forth in the embodiments described above with reference to FIGS. 8 through 16.

In step 2604, communications network 2406 or some other system or entity stores the information received from called party 2414. The information may be stored in any fashion allowing communications network 2406 to later access or use the information. In an exemplary embodiment, the information is stored in database 2408. In another exemplary embodiment, the information includes a privacy screening service bypass list 2412. Other methods and systems of storing information set forth in the embodiments above may also be used with reference to FIG. 20.

In step 2606, communications network 2406 receives a call from calling party 2414. Communications network 2406 may do so as set forth in the embodiments described above with reference to FIGS. 2, 5, 18, 20, and 25.

In step 2608, communications network 2406 determines if called party 2410 has the privacy screening service engaged. Communications network 2406 may do so as set forth in the embodiments described above with reference to FIG. 25.

If communications network 2406 determines that called party 2410 either does not subscribe to the privacy screening service or otherwise does not have the privacy screening service engaged, communications network 2406 proceeds to step 2620, as shown by step 2610.

In step 2620, communications network 2406 proceeds to normal call processing. This normal call processing is the processing communications network 2406 normally completes when no privacy screening service is engaged.

If communications network 2406 determines that called party 2410 has the privacy screening service engaged, communications network 2406 proceeds to step 2612, as shown by step 2610.

In step 2612, communications network 2406 receives identifier(s) of calling party 2414. Preferably these identifier(s) are received as part of calling party 2414's call, as set forth in embodiment described above. These identifier(s) preferably include an identifier related to or including the phone number of calling party 2414. Other identifiers preferably include the time at which the calling party 2414's call was received by communications network 2406. Still other identifiers include those set forth in the embodiments described above with reference to FIGS. 1, 5, 9, 18 to 21, 23, and 25.

Also through this step 2612, communications network 2406 determines whether or not calling party 2414 is calling from a private number. Communications network 2406 may do so as set forth in the embodiments described above.

If calling party 2414's phone number is private, communications network 2406 proceeds to step 2616, as shown by step 2614. If calling party 2414's phone number is not private, communications network 2406 proceeds to step 2622, as shown by step 2614.

In step 2622, communications network 2406 proceeds to follow procedures for privacy screening set forth for phone numbers that are not private. Communications network 2406 may do so as set forth in the embodiments described above.

In step 2616, communications network 2406 determines the disposition preference of called party 2410 for calling party 2414's call. Called party 2410's disposition preference can include as many different options as communications network 2406 can perform. These options can exceed those set forth in FIG. 23. Called party 2410's disposition preferences preferably include transferring calling party 2414's call to a transfer number, and as further set forth in the embodiments described above.

Called party 2410's disposition preferences can include transferring calling party 2414's call to a voicemail number, a cell phone number, a second telephone line of called party 2410, and as further set forth in the embodiments described above.

In conjunction or separately from called party 2410's transferring the call from calling party 2414, called party 2410's preferences may include playing custom or standard announcements to calling party 2414, through intermediate transfer to an intelligent peripheral or otherwise, as further set forth in the embodiments described above.

In an exemplary embodiment, communications network 2406 determines the disposition preference by comparing a telephone number identifier of calling party 2414 to information in database 2408. In another exemplary embodiment, communications network 2406 determines the disposition preference by comparing a telephone number identifier of calling party 2414 to privacy screening service bypass list 2412 and a time in which the call was received to a time period in privacy screening service bypass list 2412. In doing so, communications network 2406 will connect the call from calling party 2414 if calling party 2414's telephone number identifier and time of call identifier both correspond to a phone number in privacy screening service bypass list 2412.

In other exemplary embodiments, called party 2410 can establish preferences so that certain telephone numbers received within certain time periods (for example, by days of the week) will be directed by communications network 2406 to be connected to called party 2410 or to an assortment of transfer numbers, and also announcements may be played, as set forth in the embodiments described above with reference to FIG. 23.

If, for example, calling party 2414 was calling from a private number of 404-555-1234, communications network 2406 would dispose of calling party 2414's call by following called party 2410's preference. In this case, called party 2410's preference is for a calling party to be connected to called party 2410 if the calling party is calling from a private number of 404-555-1234 regardless of during what time period the call is received (by virtue of the time period "ALL" in privacy screening service bypass list 2412).

Also by way of example, if calling party 2414 was calling from a private number of 404-555-9999 at 1 a.m., communications network 2406 would dispose of calling party 2414's call by following called party 2410's preference. In this case, called party 2410's preference is for a calling party to not be connected to called party 2410 if the calling party is calling from a private number of 404-555-9999 because the call was received at a time that does not correspond to the time period set forth in called party 2410's preferences by virtue of the time period "6 a.m. to 11 p.m." in privacy screening service bypass list 2412.

In step 2618, called party 2410's disposition preference may be for communications network 2406 to follow procedures for other method(s) of privacy screening for private number calls. In an exemplary embodiment, communications network 2406 proceeds to follow privacy screening procedures for private number calls as set forth above.

If communications network 2406 recognizes calling party 2414's call by its correspondence to information in database 2408, communications network 2406 can, in an exemplary embodiment, notify called party 2410 of the identity of calling party 2414 when identity information is included in information in database 2408 (if allowed by law). In another exemplary embodiment, communications network 2406 can notify called party 2410 that calling party 2414 is calling by displaying the Name/Details from privacy screening service bypass list 2412 relating to the telephone number from which calling party 2414 called, preferably through an LCD display.

In another exemplary embodiment, after, before, or concurrent with communications network 2406 connecting calling party 2414's call to called party 2410, communications network 2406 can notify called party 2410 that a calling party whose telephone number identifier corresponds to a telephone number in privacy screening service bypass list 2412 is calling by displaying "RingThruList," preferably through an LCD display.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   receiving a call from a calling party;
   determining that a called party is connected to an information network via a communication device by comparing a telephone number that the called party is connected to with a list of telephone numbers;
   as a result of determining that the called party is connected to the information network, comparing an identifiers of the calling party with information in a database;
   notifying the called party of the call if the identifier corresponds to the information in the database, the notifying including providing a message related to the call from the calling party to the called party over the information network prior to completing the call to the called party, wherein the communication device is a computer and wherein the message is a pop-up on the computer; and
   connecting the call of the calling party if the identifier corresponds to the information in the database.

2. The method of claim 1, wherein the information in the database includes an encumbered-line bypass list.

3. The method of claim 1, wherein the information in the database is received by a communications network from the called party prior to the communications network receiving the call from the calling party.

4. The method of claim 1, wherein the called party is permitted to change the information in the database by communicating with an interface system to modify the information in the database.

5. The method of claim 1, wherein the information in the database includes a telephone numbers.

6. The method of claim 1, further comprising receiving the identifier of the calling party as part of transmission of the call from the calling party.

7. A method by which a communications network manages a call from a calling party to a called party, comprising:
   receiving information from the called party prior to receiving the call from the calling party;
   storing the information in a database;
   receiving an identifiers of the calling party;
   determining that the called party is connected to an information network via a communication device by comparing a telephone number that the called party is connected to with a list of telephone numbers;
   as a result of determining that the called party is connected to the information network, completing the call to the called party over the information network when the identifiers matches the information in the database; and
   providing a message related to the call from the calling party to the called party over the information network prior to completing the call to the called party, wherein the communication device is a computer and wherein the message is a pop-up on the computer.

8. The method of claim 7, wherein the message is a request to assent to the call being completed over the information network.

9. A system that manages a call from a calling party to a called party connected to an information network via a computer, comprising:
   a database of information; and
   network element, the network element being responsive to the call from the calling party to the called party by determining whether the called party is connected via the computer to the information network, receiving an identifier of the calling party and comparing the identifier to the information of the database upon determining that the called party is connected to the information network by comparing a telephone number that the called party is connected to with a list of telephone numbers and connecting the calling party to the called party in accordance with a disposition preference of the called party when the called party is connected to the information network;
   wherein the disposition preference is provided by the called party in response to being prompted via the information network while the called party is connected to the information network, wherein the prompt is a popup window on the computer of the called party.

10. The system of claim 9, wherein the disposition preference varies depending upon the identifier of the calling party.

11. The system of claim 9, wherein the disposition preference varies depending upon a criteria unrelated to the identifier of the calling party.

12. The system of claim 9, wherein the disposition preference is to disconnect the called party from the information network and then complete the call to the called party via the information network.

13. The system of claim 9, wherein the disposition preference is to complete the call to the called party via the information network while the called party is connected to the information network.

* * * * *